United States Patent
Lewis

(10) Patent No.: US 6,293,582 B1
(45) Date of Patent: *Sep. 25, 2001

(54) CONTROL SYSTEM FOR AIR BAGS IN DIFFERENT VEHICLE LOCATIONS

(75) Inventor: Donald J. Lewis, Scottsdale, AZ (US)

(73) Assignee: Universal Propulsion Company, Inc., Phoenix, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,739

(22) Filed: Mar. 3, 1998

Related U.S. Application Data

(63) Continuation-in-part of application No. 08/826,612, filed on Apr. 4, 1997, now Pat. No. 5,871,230, which is a continuation-in-part of application No. 08/665,121, filed on Jun. 14, 1996, now abandoned.

(51) Int. Cl.[7] .............................. B60R 21/32; B60R 21/22
(52) U.S. Cl. ........................ 280/735; 280/730.1; 244/121
(58) Field of Search ................................ 280/730.1, 735, 280/728.1, 733; 244/121

(56) References Cited

U.S. PATENT DOCUMENTS

| | | |
|---|---|---|
| 3,430,979 | 3/1969 | Terry et al. . |
| 3,603,535 * | 9/1971 | DePolo ............................. 280/730.1 |
| 3,682,498 | 8/1972 | Rutzki . |
| 3,720,445 | 3/1973 | Bennett . |
| 3,756,620 | 9/1973 | Radke . |
| 3,791,670 | 2/1974 | Lucore et al. . |
| 3,810,653 * | 5/1974 | Schiesterl et al. ................... 280/735 |
| 3,810,654 | 5/1974 | DeBano, Jr. et al. . |
| 3,841,654 | 10/1974 | Lewis . |
| 3,865,398 | 2/1975 | Woll . |
| 3,866,940 | 2/1975 | Lewis . |
| 3,868,627 | 2/1975 | Lawwill . |
| 3,874,694 | 4/1975 | Stephenson . |
| 3,905,615 | 9/1975 | Schulman . |
| 3,933,370 | 1/1976 | Abe et al. . |
| 3,948,541 | 4/1976 | Schulman . |
| 3,971,569 | 7/1976 | Abe et al. . |
| 3,975,037 | 8/1976 | Hontschik et al. . |
| 4,186,941 | 2/1980 | Scholz et al. . |
| 4,243,248 * | 1/1981 | Scholz et al. ........................ 280/735 |
| 4,348,037 | 9/1982 | Law et al. . |
| 4,842,300 | 6/1989 | Ziomek et al. . |
| 5,048,863 | 9/1991 | Henseler et al. . |
| 5,062,662 | 11/1991 | Cameron . |
| 5,149,130 | 9/1992 | Wooley et al. . |
| 5,161,821 | 11/1992 | Curtis . |
| 5,280,953 | 1/1994 | Wolanin et al. . |
| 5,282,648 | 2/1994 | Peterson . |
| 5,335,598 | 8/1994 | Lewis et al. . |
| 5,335,884 * | 8/1994 | Kalberer et al. .................. 280/730.1 |

(List continued on next page.)

FOREIGN PATENT DOCUMENTS

| | | | |
|---|---|---|---|
| 1 902 793 | 8/1970 | (DE) . | |
| 43 05 291 | 9/1993 | (DE) .................................... | 280/733 |
| 88/07947 | 10/1988 | (WO) .................................... | 280/733 |

Primary Examiner—Peter C. English
(74) Attorney, Agent, or Firm—Pennie & Edmonds LLP

(57) ABSTRACT

A vehicle restraint system for a seated occupant including a lap belt system and an inflatable member mounted on the lab belt and restrained by the belt when inflated. The restraint system is applicable to multi-row seated vehicles in which a control system controls air bag deployment in rows located at first, second and other vehicle locations. Further, the system may include a device for detecting an impending collision of the vehicle and an object and deploy bags in anticipation of such collision.

6 Claims, 25 Drawing Sheets

U.S. PATENT DOCUMENTS

| | | |
|---|---|---|
| 5,362,101 | 11/1994 | Sugiura et al. . |
| 5,378,019 | 1/1995 | Smith et al. . |
| 5,390,953 | 2/1995 | Tanaka et al. . |
| 5,393,091 | 2/1995 | Tanaka et al. . |
| 5,395,134 | 3/1995 | Gunn et al. . |
| 5,440,991 | 8/1995 | Lewis et al. . |
| 5,445,411 | 8/1995 | Kamiyama et al. . |
| 5,465,999 | 11/1995 | Tanaka et al. . |
| 5,489,119 | 2/1996 | Prescaro et al. . |
| 5,499,579 | 3/1996 | Lewis . |
| 5,507,230 | 4/1996 | Lewis et al. . |
| 5,597,178 | 1/1997 | Hardin, Jr. . |
| 5,683,109 | 11/1997 | Birman . |
| 6,097,332 | 8/2000 | Crosby, II ............... 342/72 |
| 6,161,198 | 12/2000 | Hill et al. ................ 714/15 |
| 6,161,439 | 12/2000 | Stanley .............. 73/862.391 |

* cited by examiner

CONTROL SYSTEM FOR AIR BAGS IN DIFFERENT VEHICLE LOCATIONS

RELATED APPLICATIONS

This application is a continuation-in-part of U.S. patent application Ser. No. 08/826,612 filed Apr. 4, 1997 entitled "Lap Mounted Inflatable Bag And Method Of Use", now U.S. Pat. No. 5,871,230, which is in turn a continuation-in-part of U.S. patent application Ser. No. 08/665,121 filed Jun. 14, 1996 entitled "Lap Mounted Inflatable Bag And Method Of Use", now abandoned.

BACKGROUND OF THE INVENTION

Inflatable elements, bag or belt, deploying from locations adjacent vehicle occupants have been proposed and suggested to distribute belt loading during a collision (U.S. Pat. Nos. 3,682,498 and 3,841,654).

Prior restraint systems have combined seat belts, including lap and shoulder components, with inflatable members. For example, vehicle air bags have been proposed to be mounted adjacent shoulder belts and lap belts for deployment upon rapid deceleration of a vehicle (U.S. Pat. No. 5,062,662). Other prior inflatable bag vehicle restraint systems have required that the bag be supported by a portion of the vehicle in front of the occupant (i.e., the dashboard or wheel post unit). Further, prior lap belt mounted bags were deployable in front of the occupant's belt and have not caused the lap belt to have its slack removed by the inflation of the bag.

Finally, it has been proposed to provide bags for inflation between the occupant and shoulder straps (U.S. Pat. No. 3,971,569).

None of the prior art proposals provide proper protection where the restraint system can only be deployable from and restrained by a lap belt area.

SUMMARY OF THE INVENTION

The present invention comprises an occupant vehicle restraint system in which a configured inflatable air bag is supported by a lap belt. The lap belt is positioned adjacent the bag or in a passageway in the air bag which passageway is part of the inflatable pressure-retaining envelope of the bag. The bag is sized and shaped so that the force of the occupant's torso tending to move forward in a rapid deceleration of the vehicle is restrained by the bag engaging a sufficiently large support area consisting of the top portion of the occupant's legs and a variable seat surface between the occupant's legs. The belt-receiving passageway may be located so that a rear portion of the bag is inflatable between the belt and the occupant and the remainder of the bag is inflatable forward of the belt to prevent any substantial rotation of the torso.

By so locating the belt-engaging bag surface or the belt-receiving passageway, a rear portion of the bag when inflated tightens the lap belt as such rear portion presses against the occupant's lap upper thigh portion and lower stomach area. At the same time the forward portion of the bag inflates to serve as a structural air stiffened column to provide a restraint against the occupant's forward movement and rotation of the occupant's torso.

The present inventive restraint system and its method of operation utilizes an air bag deployed from the lap belt area which bag as deployed is fully supported and constrained by (1) the lap belt and (2) surfaces including occupant's legs and the surface upon which the occupant is seated. The invention is particularly useful for occupants seated in seats that are not adjacent a dashboard or a wheel post. Occupants in the back seats in passenger land vehicles and airplane passengers are readily protectable utilizing the present inventive restraint system.

DESCRIPTION OF THE PREFERRED EMBODIMENTS

Figure 1:
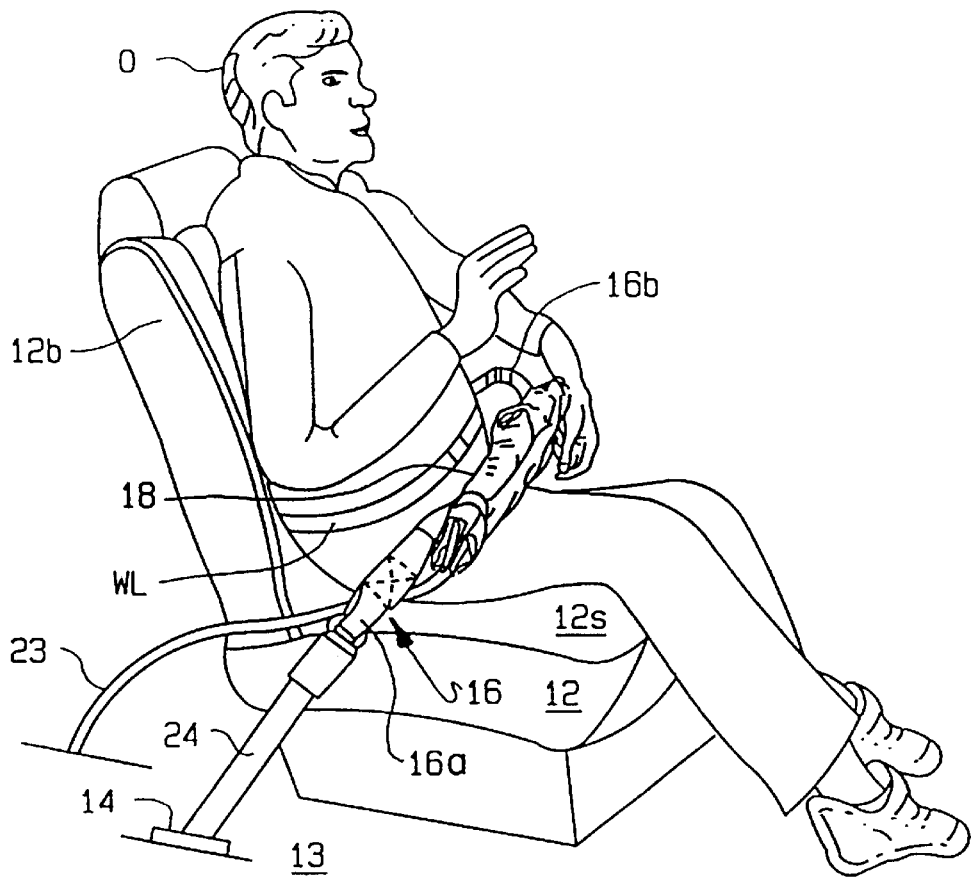
FIG. 1 is a perspective view of an occupant in a front seat with a lap belt and folded air bag prior to inflation.
Figure 3:
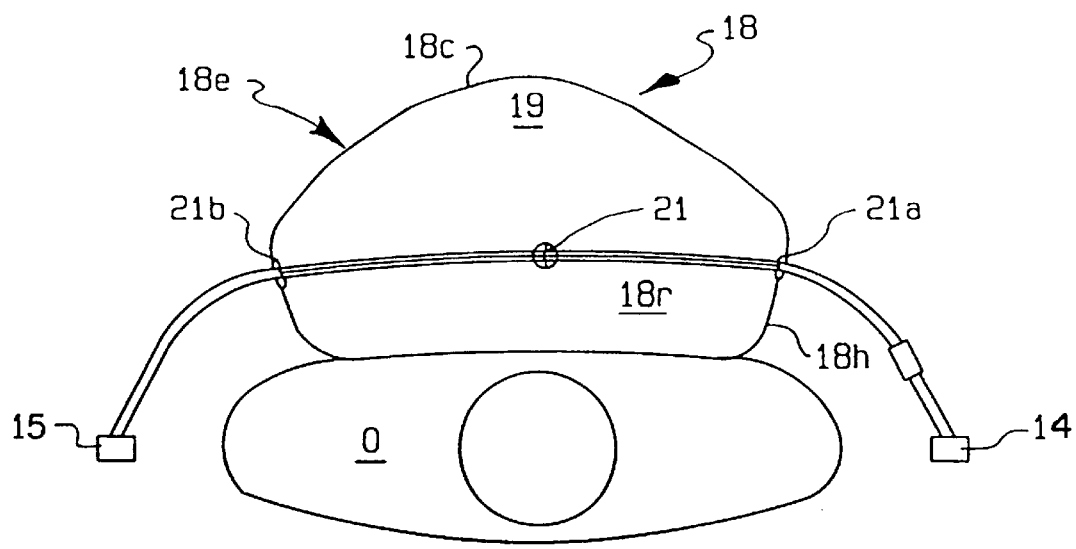
FIG. 3 is a diagrammatic plan view of the occupant and inflated bag.
Figure 4:
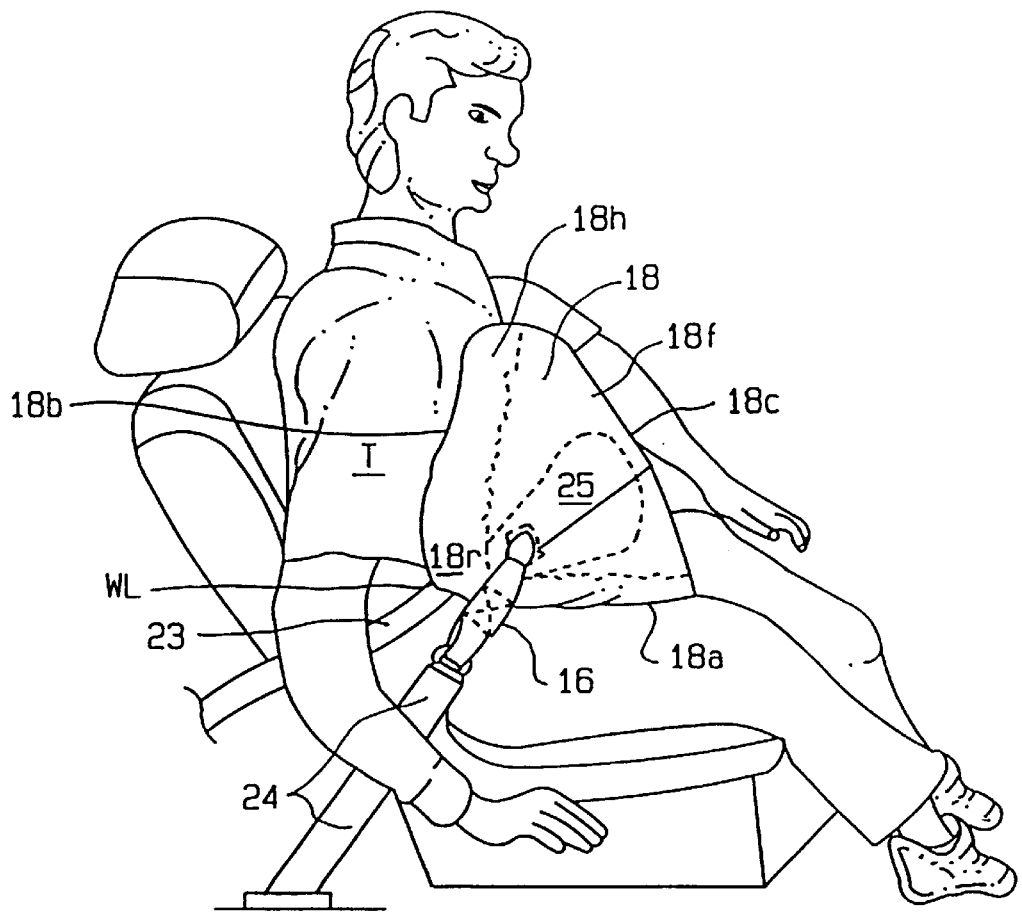
FIG. 4 is a view similar to FIG. 1 showing the bag as first inflated.

In FIGS. 1, 3 and 4, occupant's (O) seat 12 with seat surface 12s and seat back 12b are mounted on vehicle floor 13. Occupant (O) is shown in passenger seat 12 with lap belt 16 across occupant's (O) lap. Lap belt right portion 16a is engaged in belt extension 24 which in turn is anchored in right floor anchor 14 in vehicle floor 13 and the left belt portion 16b is secured to the vehicle floor 13 by left floor anchor 15. Alternatively, lap belt may have two sections and a buckle.

With reference in particular to FIG. 3, bag 18 with exterior inflatable cloth body 19 has a cloth passageway 21 between slot portals 21a, 21b through which lap belt 16 is passed. Cloth body 19 together with cloth passageway 21 comprise the pressure-retaining envelope 18e of bag 18 into which envelope 18e the gases of inflation are introduced or formed. Lap belt 16 is readily slidable back and forth through passageway 21 when bag 18 is deflated. Such movement provides for adjustment of bag 18 with respect to the occupant. Bag 18's gas inlet neck 22 (FIG. 7) can be connected to gas conduit 23 extending from a remote location such as the floor 13. Gas conduit 23 is supplied gas from a storage gas container or a pyrotechnic gas inflator or a combination thereof, and alternately the inflation source may be contained within the bag 18.

Figure 2:
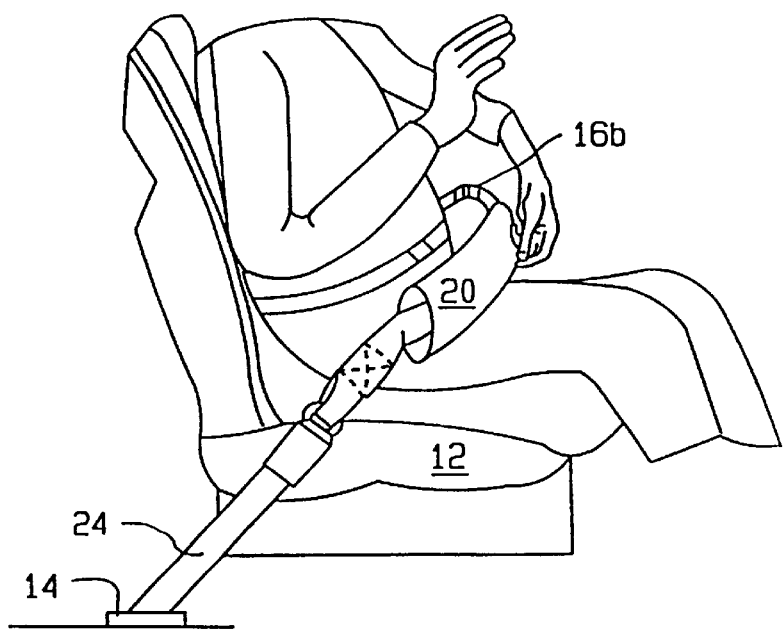
FIG. 2 is a partial perspective view similar to FIG. 1 showing the folded bag in a rupturable pouch prior to inflation and illustrating the looseness with which the belt may be worn and still be effective.

Turning to FIG. 2, an alternative embodiment is shown in which folded bag 18 is covered by an elongated rupturable pouch 20. Bag 18 is shown folded for positioning in pouch 20 in a ready-to-deploy position with belt 16 loosely positioned for the comfort of the occupant. This alternative system has a gas-generating inflator positioned in bag 18 or pouch 20.

FIG. 4 shows bag 18 with the alternate inflation entrance of gases from conduit 23 through neck 22. Bag 18, as inflated, is generally round in shape as viewed from above (FIG. 3) and generally triangular in shape as viewed from the side (FIG. 4). Bag 18 has a bottom seat surface and leg engaging surface 18a; a torso engaging surface 18b and front non-engaging surface 18c. Surfaces 18a and 18b intersect along occupant's waistline (WL). Since belt 16 passes through bag passageway 21 which is distance (d) from the occupant's waistline (WL), the inflation of bag portion 18r to the rear of belt 16 pushes occupant (O) back and down in his or her seat as bag 18 is first inflated (see FIGS. 4 and 5). This action also removes any slack that may have existed in belt 16 due to looseness of wearing. Further, the inflation of the bag 18 and the creation of inflated bag space also displaces bag over spaces 18h and 18r toward the occupant's chest and upper leg, respectively. Front bag portion 18f, the remaining portion of bag 18, is forward of the belt 16. Front bag portion 18f functions to support and resist rotation of occupant's (O) torso (T) as forces of vehicle deceleration act on torso (T). Bag 18 may also include a set up reinforcing cloth panel 25 to strengthen bag 18 in the belt-engaging area which must withstand forces of inflation and occupant restraint as the vehicle decelerates.

Figure 5:
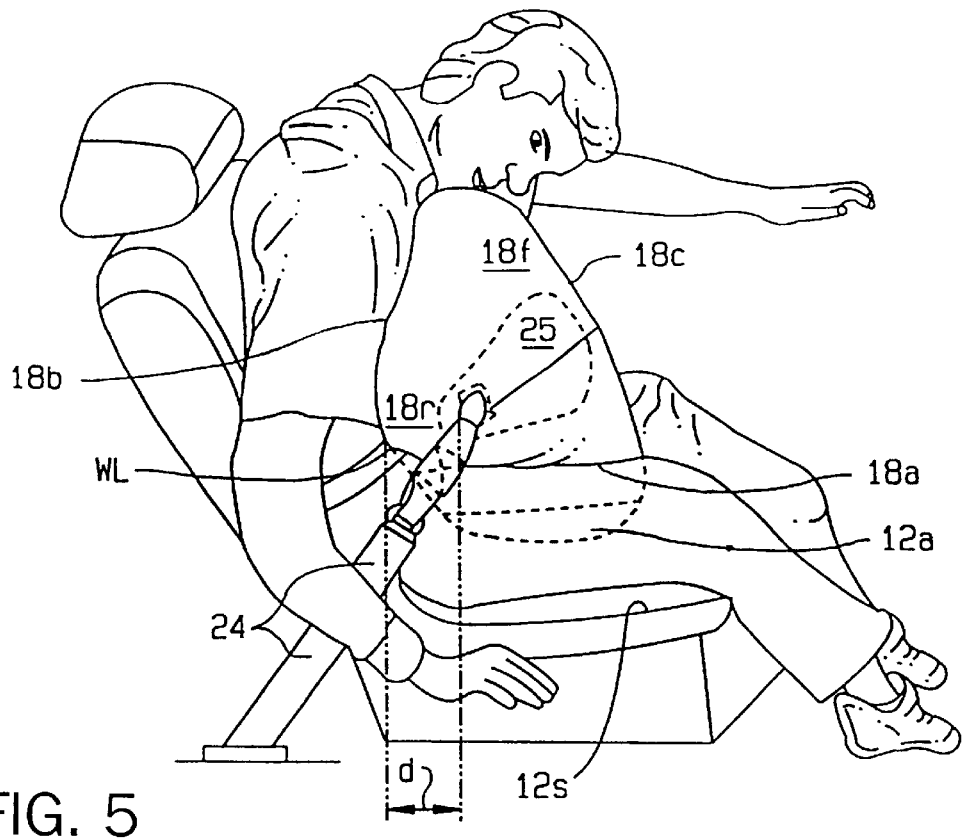
FIG. 5 is a view similar to FIG. 4 after inflation with the occupant's torso having moved forward a small distance.

It is contemplated that inflation of bag 18 is accomplished sufficiently rapidly, using inflators of stored gas or pyrotechnic type or combinations thereof, so that the occupant's lap belt 16 is tightened by inflation of the rear bag portion 18r prior to forces of deceleration acting on the occupant's (O) torso (T) which force tends to move the torso (T) forward in rotational movement about belt 16. Only a few degrees of torso (T) rotation is permitted by the compression of bag 18. Any additional torso rotation will depend on the occupant's seated position and whether bag 18 rests on the occupant's legs, seat surface 12s or combination of both. Bag 18 is shown in FIG. 5 engaging seat surface 12s over area 12a as torso (T) is decelerated. Torso rotation is preferably less than 10° the vertical. However, depending on the occupant's size and the size and shape of the bag, rotation of the torso may be up to 30°.

Figure 9:
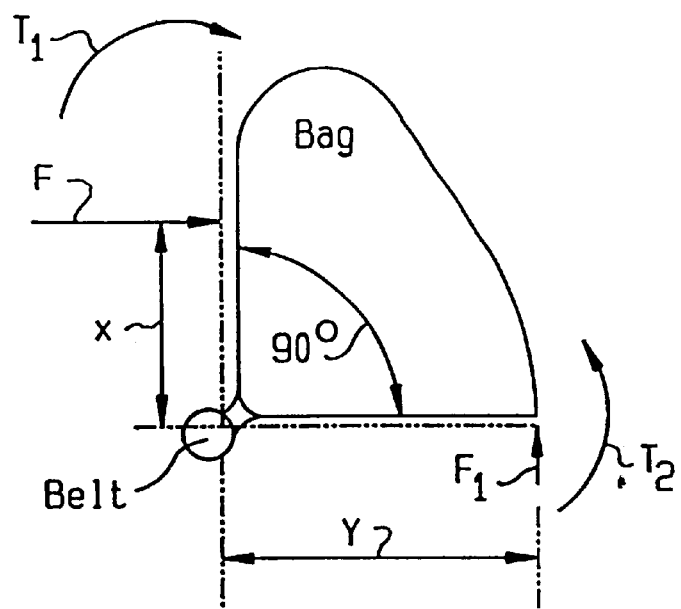
FIG. 9 is a schematic diagram showing the forces and torques created during rapid deceleration of the vehicle and bag deployment.

With particular reference to schematic FIG. 9, horizontal force (F) represents the force exerted by occupant's torso at a distance X from lap belt 16 creating a torque ($T_1$). To resist torque ($T_1$) bag 18 generates an equal and opposite torque ($T_2$). Torque ($T_2$) is force ($F_1$) times distance (Y).

Figure 10:
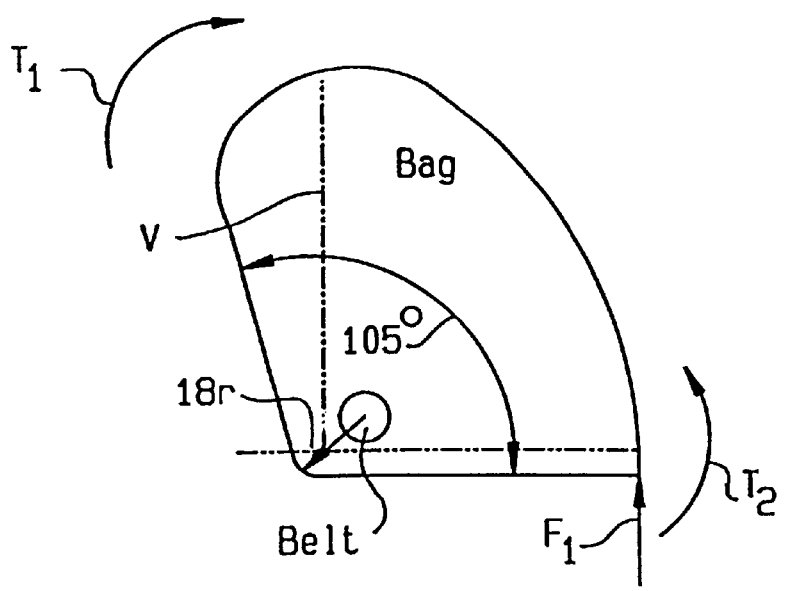
FIG. 10 is a further schematic diagram showing forces and torques upon initial bag inflation where the lap belt is positioned within a bag passageway.

FIG. 10 is also a schematic showing the embodiment in which the belt passes through the bag with bag portion 18r inflating between the belt and the occupant. Initial bag inflation causes the bag to push the occupant back of vertical line (V) 15° (note the 90° angle of FIG. 9 and the 105° angle of FIG. 10). Bag portion 18r pushes the occupant down in the seat and bag portion 18h pushes occupant back in his seat.

Bag 18 when inflated is restrained from forward movement by lap belt 16. Bag 18 rotates a few degrees as it is acted on the forces of the occupant's torso deceleration. Bag 18 is shaped and sized to prevent substantial torso rotation of any occupant including a large man. Smaller occupants will experience even less torso rotation. Bag 18 has a bag exterior surface 18a which engages a substantial area of occupant's legs and seat surface between the occupant's waist and knees. Bag 18 also has a surface 18b for engaging a substantial portion of the torso from the waist to the head. Bag 18 may also be sized to support occupant's head. Preferably, bag surface 18a engages ⅓ to ⅔ of occupant's upper legs. Upper legs are the portion of the legs between the hips and knees. Bag surface 18a also engages the seat surface over the seat surface area between occupant's legs.

Figure 6:
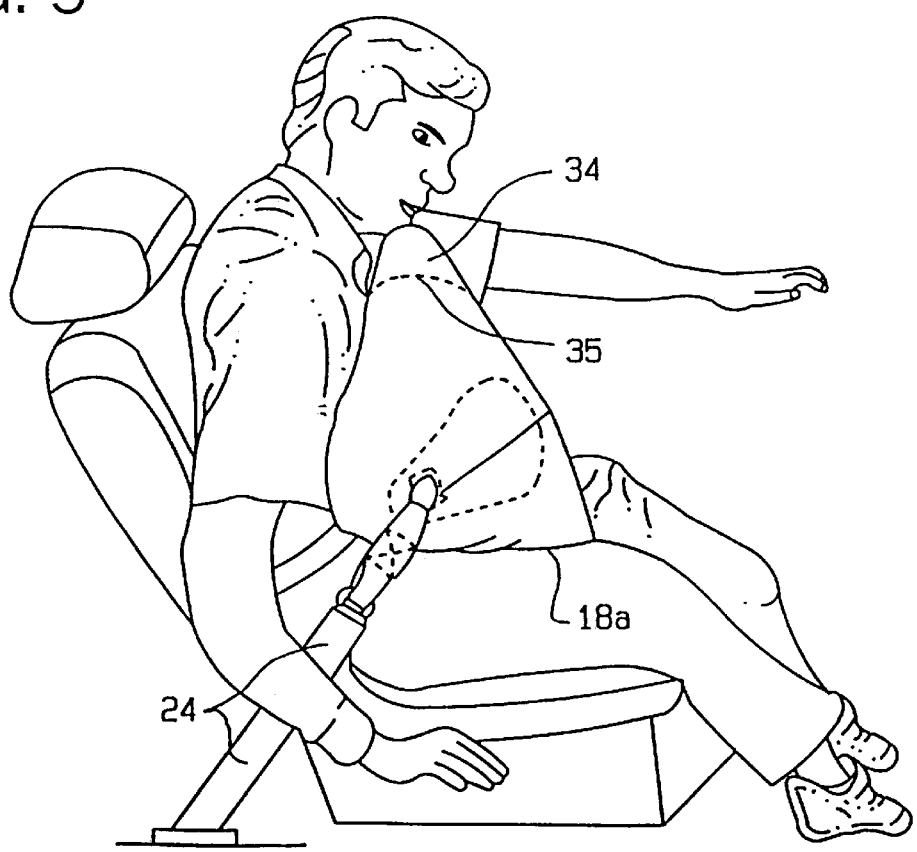
FIG. 6 is an alternative embodiment in which the bag includes an upper blister for additional head support to further reduce head rotation to a lesser angle.

In a further alternative embodiment shown in FIG. 6, bag 18 includes deployable blister 34. As occupant's (O) torso (T) exerts forces of compression on bag 18 increasing the gas pressure therein to a selected threshold allowing stitches 35 to rupture so that blister section 34 inflates to provide support for the occupant's (O) and head (H).

Figure 7:
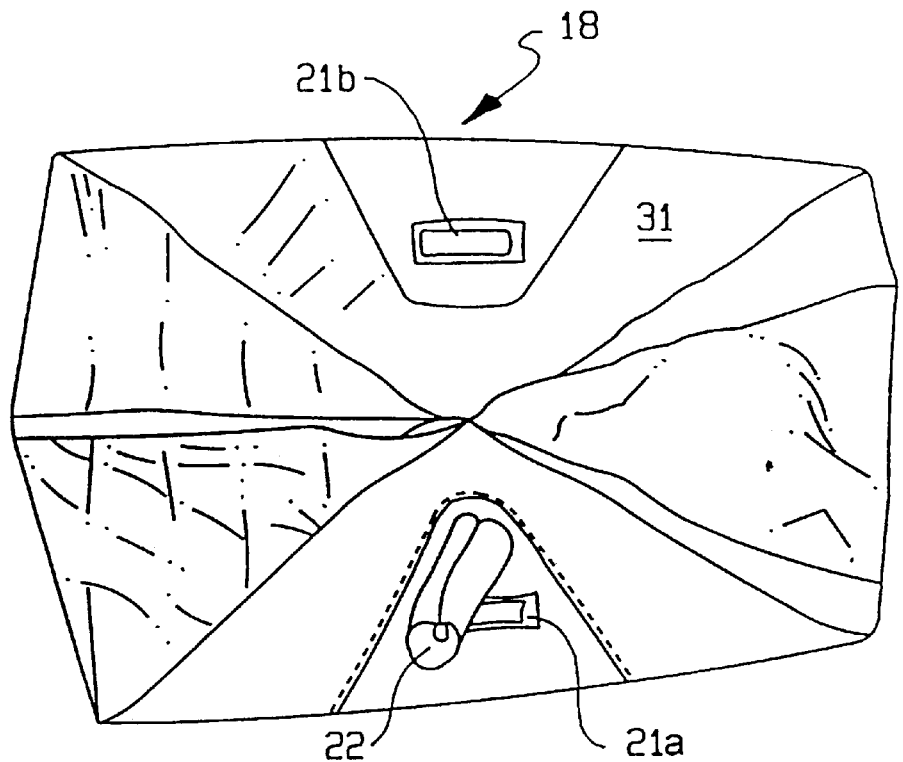
FIG. 7 is a bottom view of the bag prior to folding.
Figure 8:
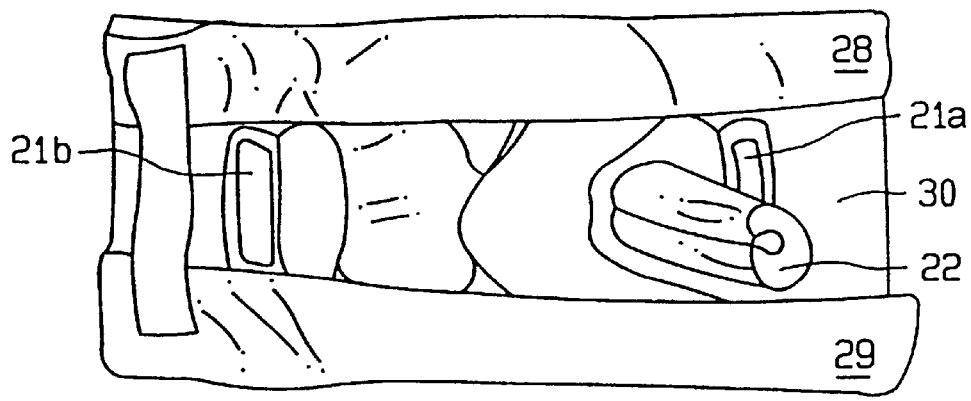
FIG. 8 is a partially folded view of the bag.

Turning to FIG. 7, uninflated bag 18 has bottom surface 31, passage outlet ends 21a, 21b and gas inlet 22. FIG. 8 shows uninflated bag 18 with outside portions 28, 29 folded to positions adjacent central bag bottom portion 30 which central portion 30 is approximately the width of belt 16.

Figure 11:
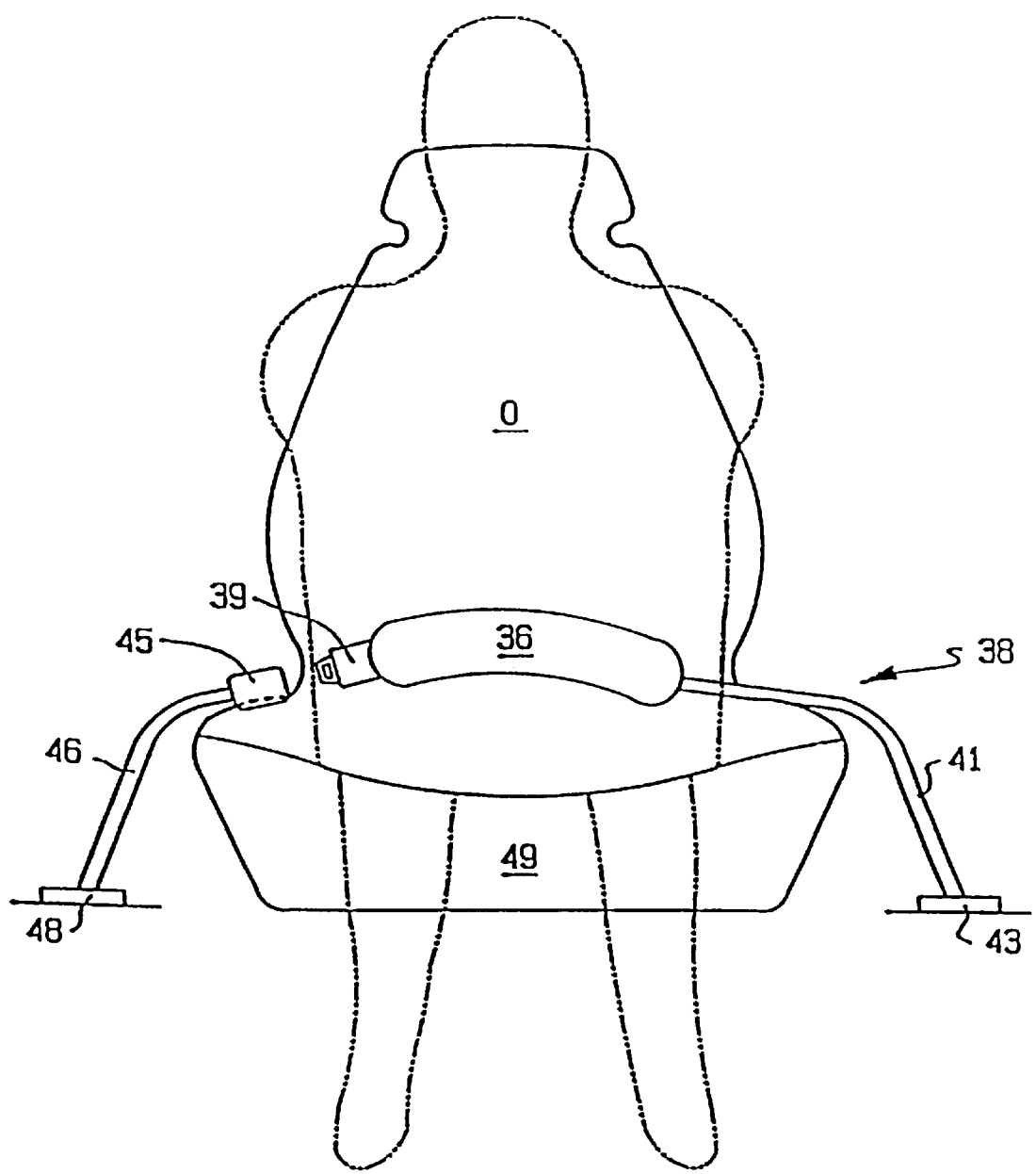
FIG. 11 is a front elevational view of an embodiment of the present invention in which an inflatable member is mounted in a lap belt system which includes an inflation arrangement.

FIG. 11 illustrates a further embodiment of the present invention in which the inflatable member 36 which may be of any shape and configuration is foldably mounted on lap belt system 38 which system has positioned in it the entire inflation arrangement. Tongue unit 39 is connected to a tongue belt section 41 which in turn is attached to tongue belt section anchor 43. The belt system 38 also includes a buckle 45, a buckle belt section 46 and a buckle anchor 48. Occupant (O) seated on seat 49 is restrained by belt system 38. Upon inflation of inflatable member 36 further occupant protection is provided as described below.

Figure 12:
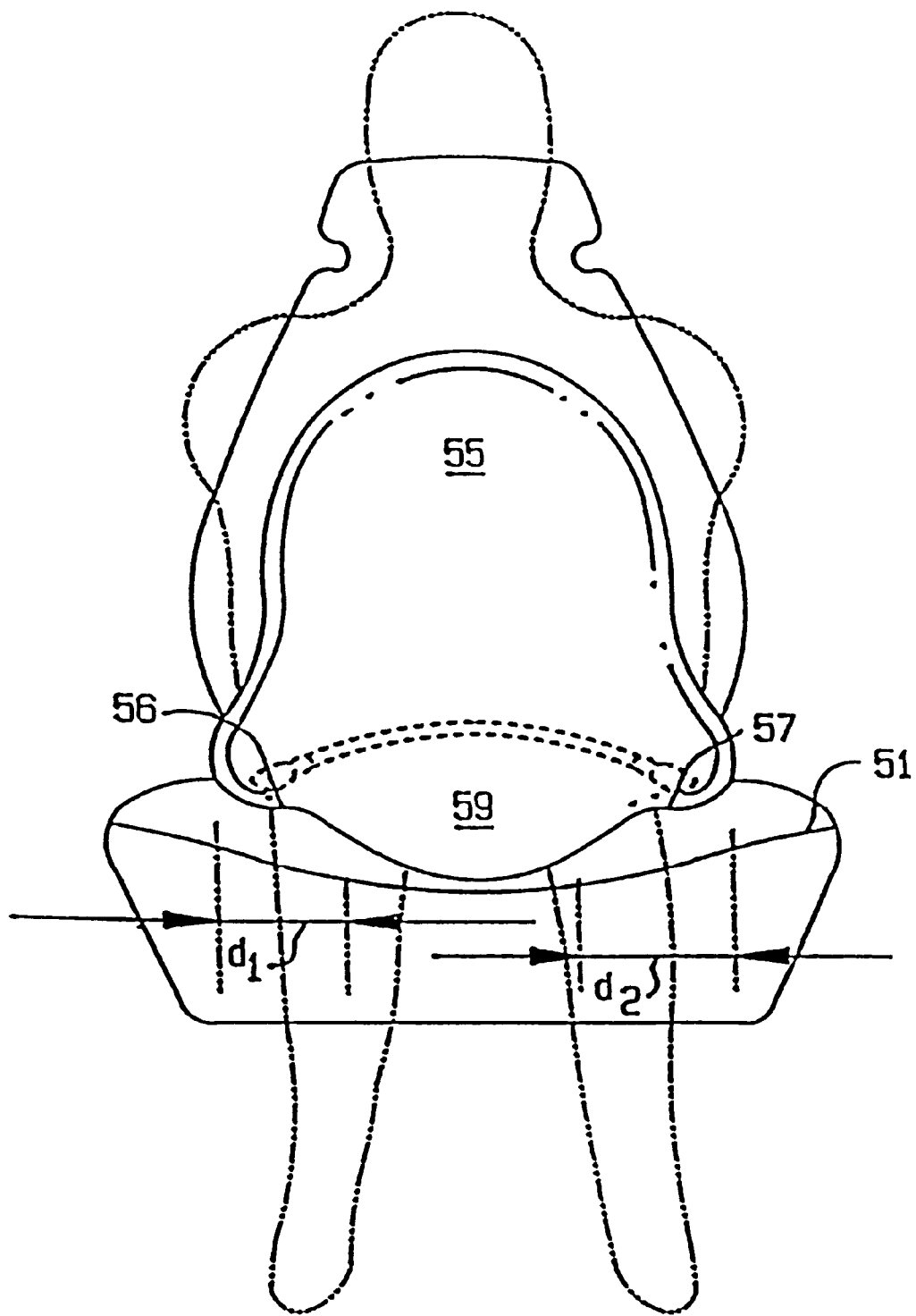
FIG. 12 is a front elevational view of an inflated bag of particular shape.

Turning to FIG. 12, an inflatable member in the form of bag 55 is shown which bag 55 has a particular shape including leg-engaging bag wings 56, 57 and a central blister section 59 which extends downwardly near to or against seat surface 51. Whether blister section 59 engages seat surface 51 depends on the extent to which occupant's legs are initially spread apart and the extent to which blister 59 of bag 55, as inflated, causes any further leg separation. Bag wings 56, 57 are positioned and shaped with widths $d_1$, $d_2$, respectively so that they properly serve both large and small occupants.

Figure 13:
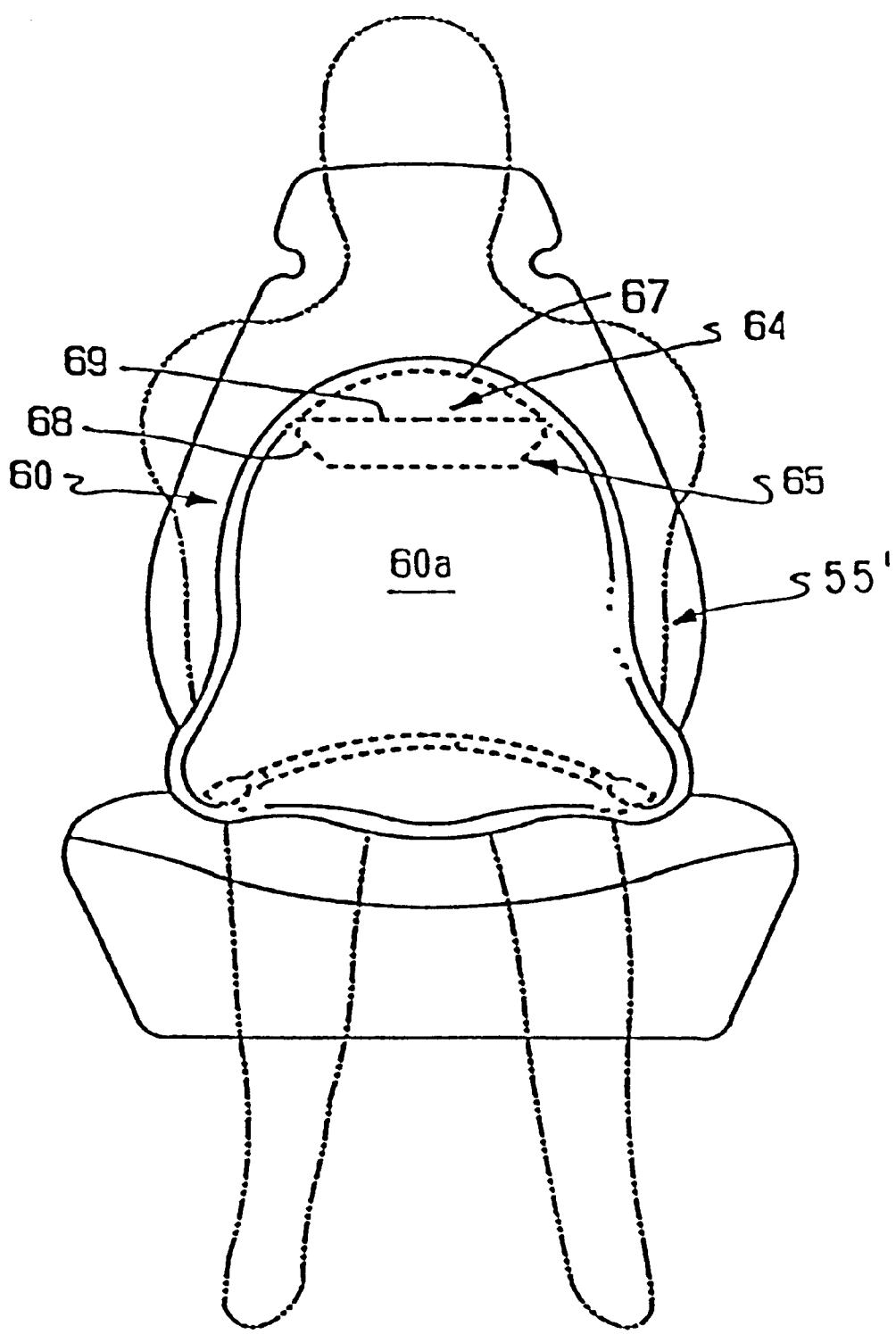
FIG. 13 is a front elevational view of an inflated bag with upper expansion pockets prior to their inflation.

Turning to FIG. 13, bag 55' consists of bag body 60 made of two stitched together bag panels (only panel 60a is shown) which include two upper stitched bag body pockets 64, 65 formed by tucking bag body panel material into the interior of bag 55' and stitching such tucked-in panels to adjacent bag panels employing stitched generally-horizontal rows 67, 68 and 69. Bag body pockets 64, 65 are deployable under selected circumstances described below to increase the bag size and shape.

Figure 14:
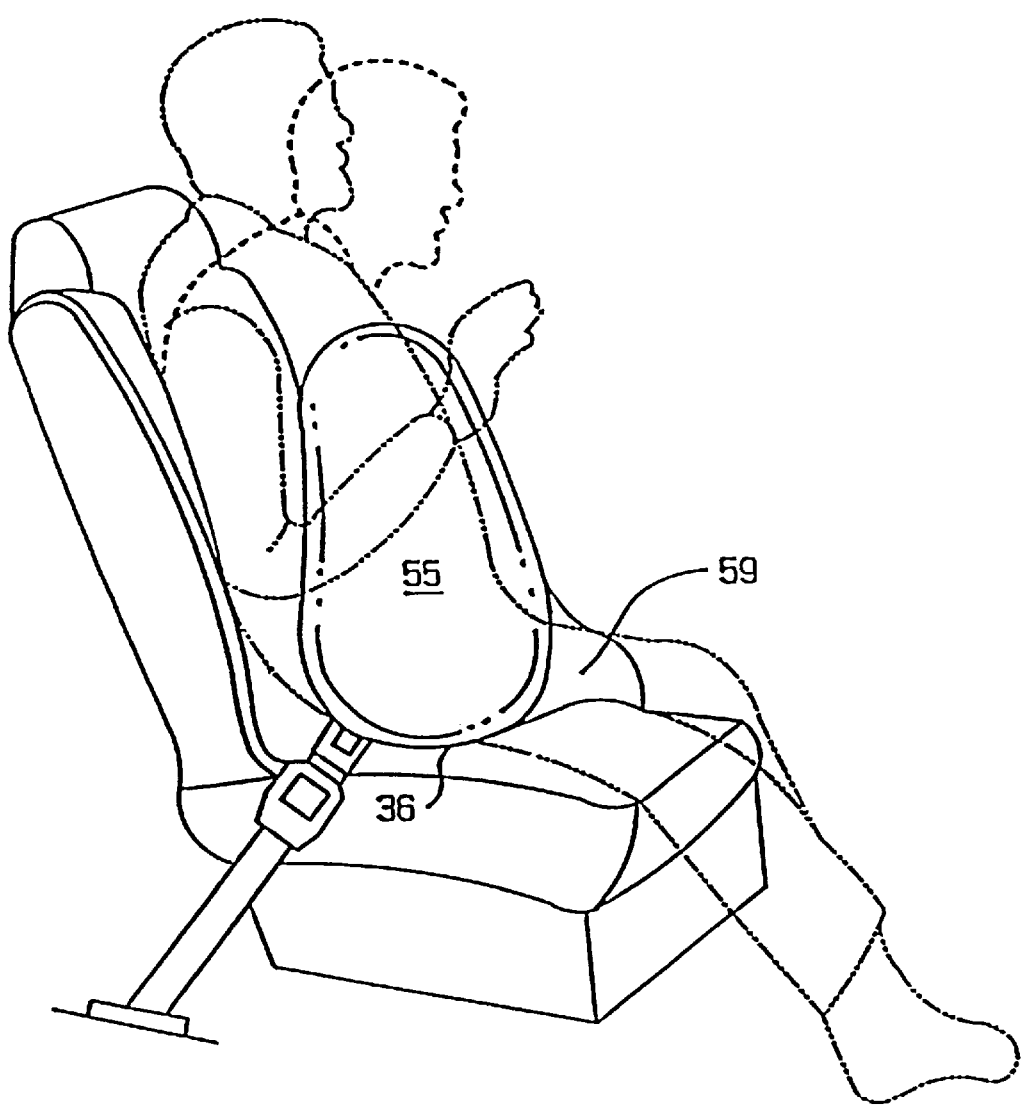
FIG. 14 is a side perspective view of the bag of FIG. 12 after inflation.

In FIG. 14 deployment of bag 55 including its blister section 59 is shown (see also FIG. 12). The forward movement of occupant (O) is shown in dashed lines.

Figure 15A:
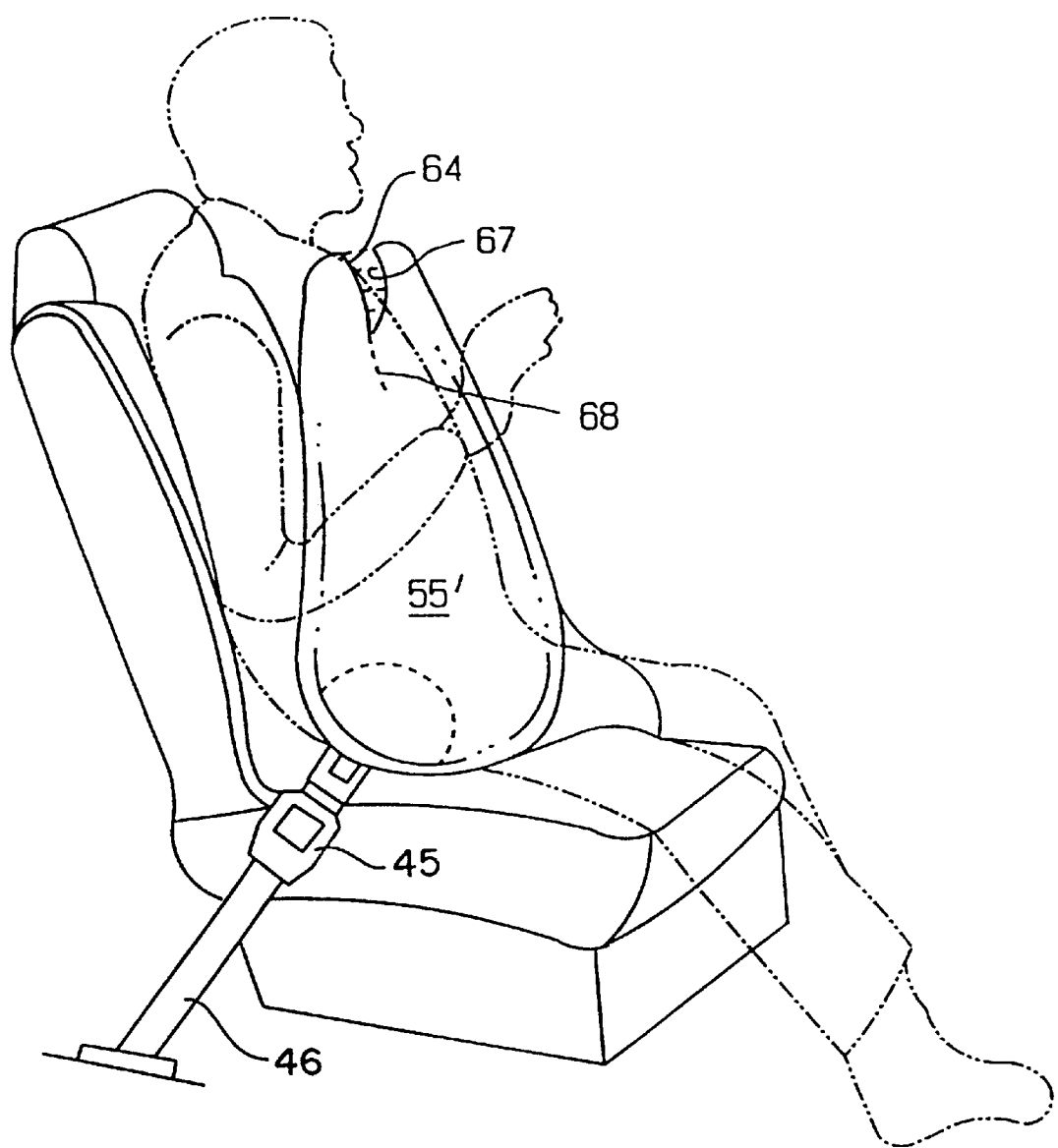
FIG. 15a is a side perspective view of the bag of FIG. 13 with an upper expansion pocket being deployed.
Figure 15B:
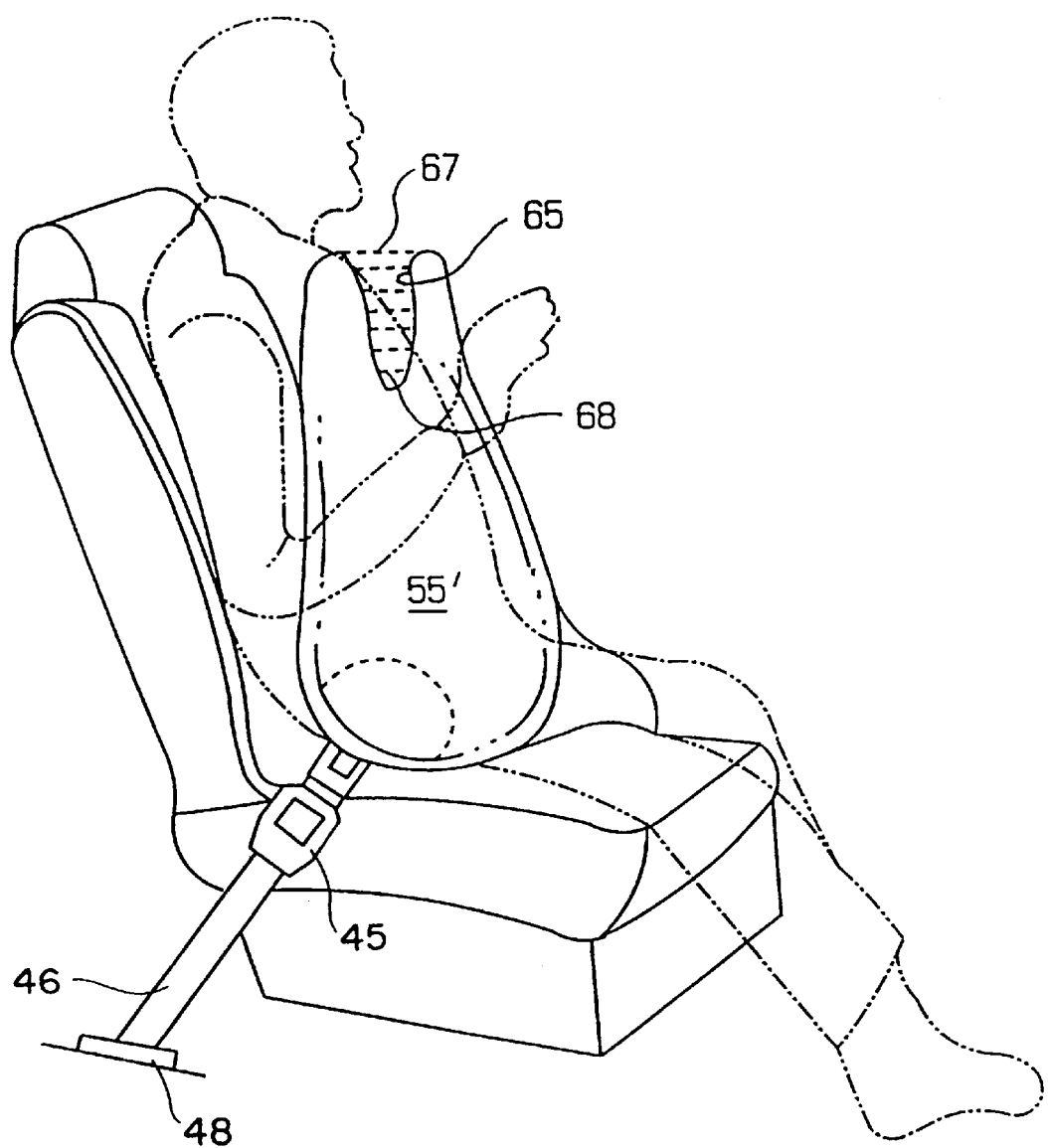
FIG. 15b is a view similar to FIG. 15a in which a further pocket is deployed.
Figure 15C:
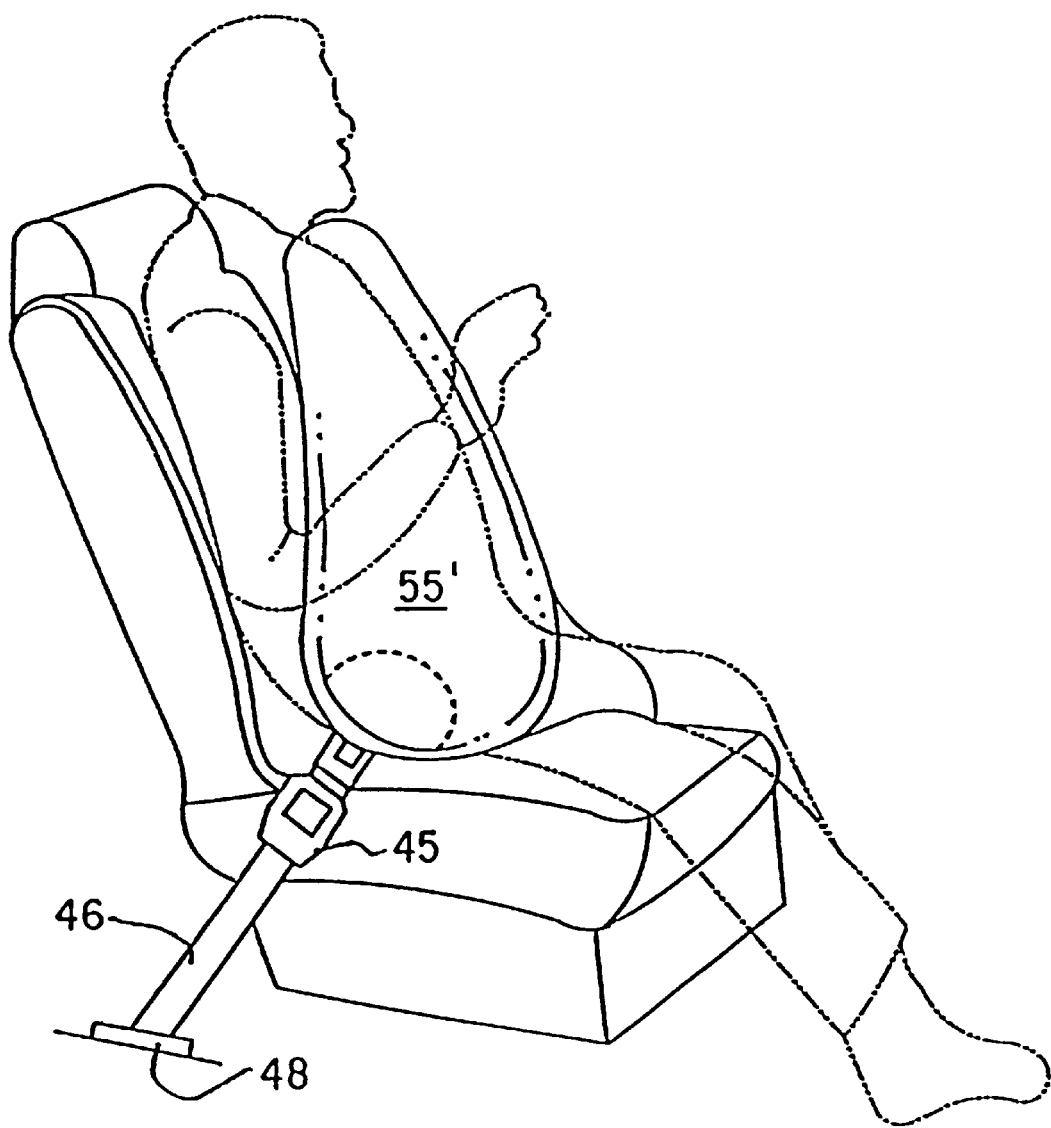
FIG. 15c is a side elevational view in which the bag pockets shown in FIGS. 15a and 15b are fully deployed.

Turning to FIGS. 15a–c, there is shown the stages of deployment of body pockets 64, 65 during inflation of bag 55' when occupant-induced internal bag pressures reach predetermined levels. The reason for pocket deployment is to increase the size and height of bag 55' to serve larger, taller and heavier occupants. As bag 55' inflates to reach its full size, forces are exerted on the bag as it controls the occupant's movement including forward torso movement causing bag pressure to increase. If the occupant (O) is sufficiently larger and heavier, pressure will build up in bag 55' to cause stitch rows 67, 68 and 69 to sequentially break and to deploy the body pockets 64, 65 as bag additions.

FIG. 15c shows bag 55' with both pockets 64, 65 fully deployed. As bag size increases by pocket deployment bag pressure is reduced for a given amount of gas in the bag; however, the forces acting on the occupant may remain the same since the area over which the forces act has been increased.

Figure 16A:
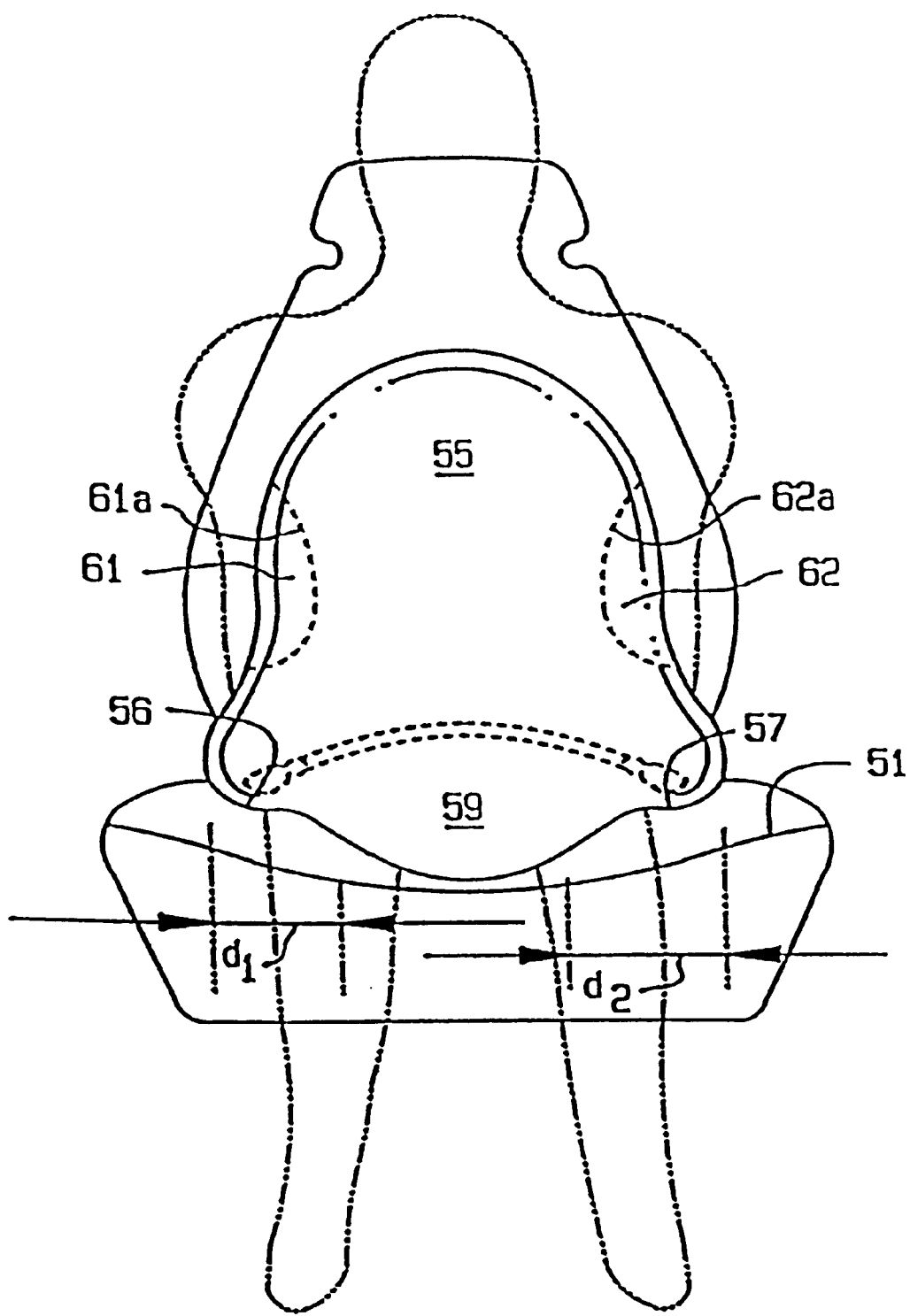
FIG. 16a is a front elevational view of a bag having side pockets which bag has been inflated without side pocket deployment.
Figure 16B:
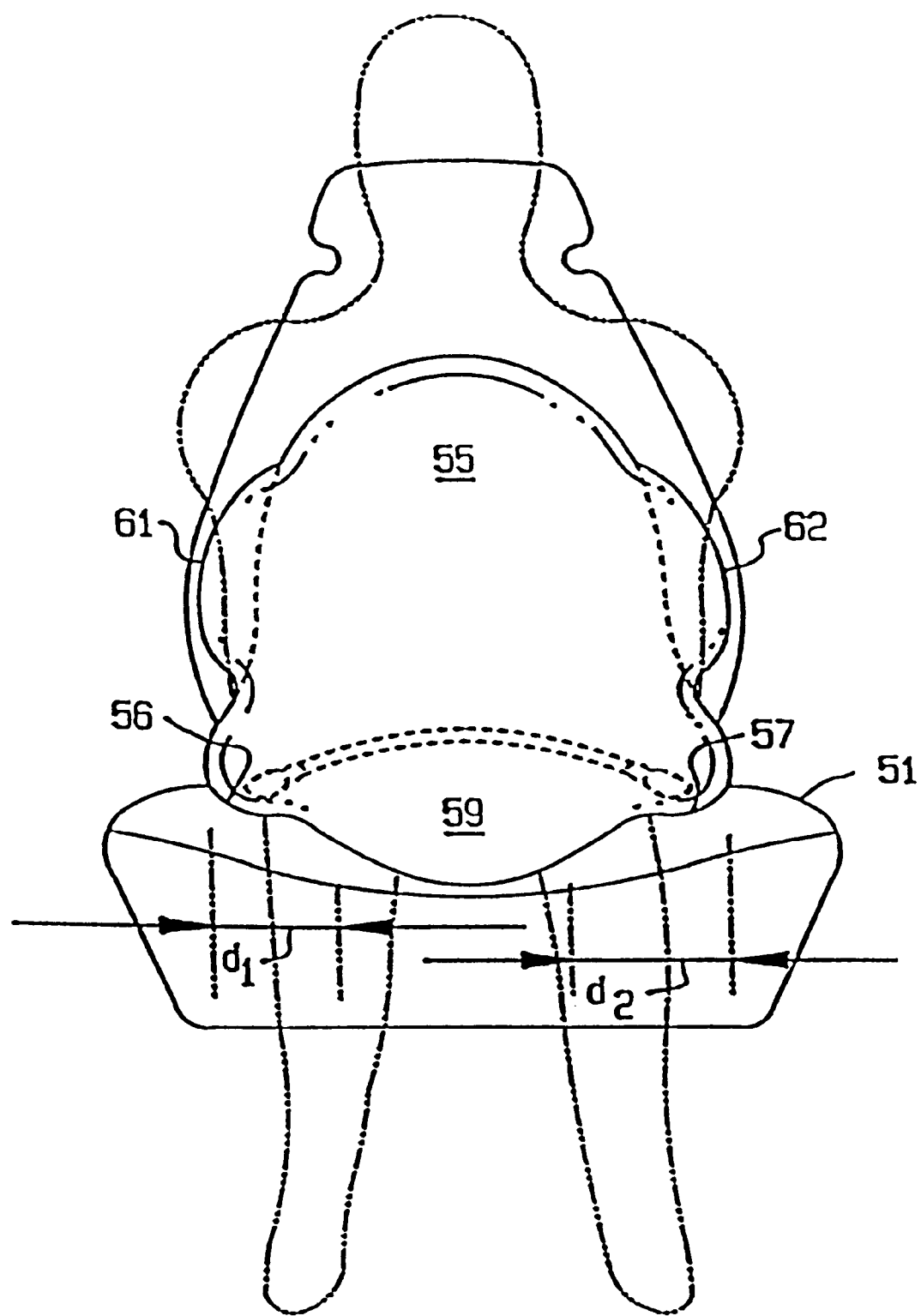
FIG. 16b is a view similar to FIG. 16a in which the side pockets are deployed.
Figure 16C:
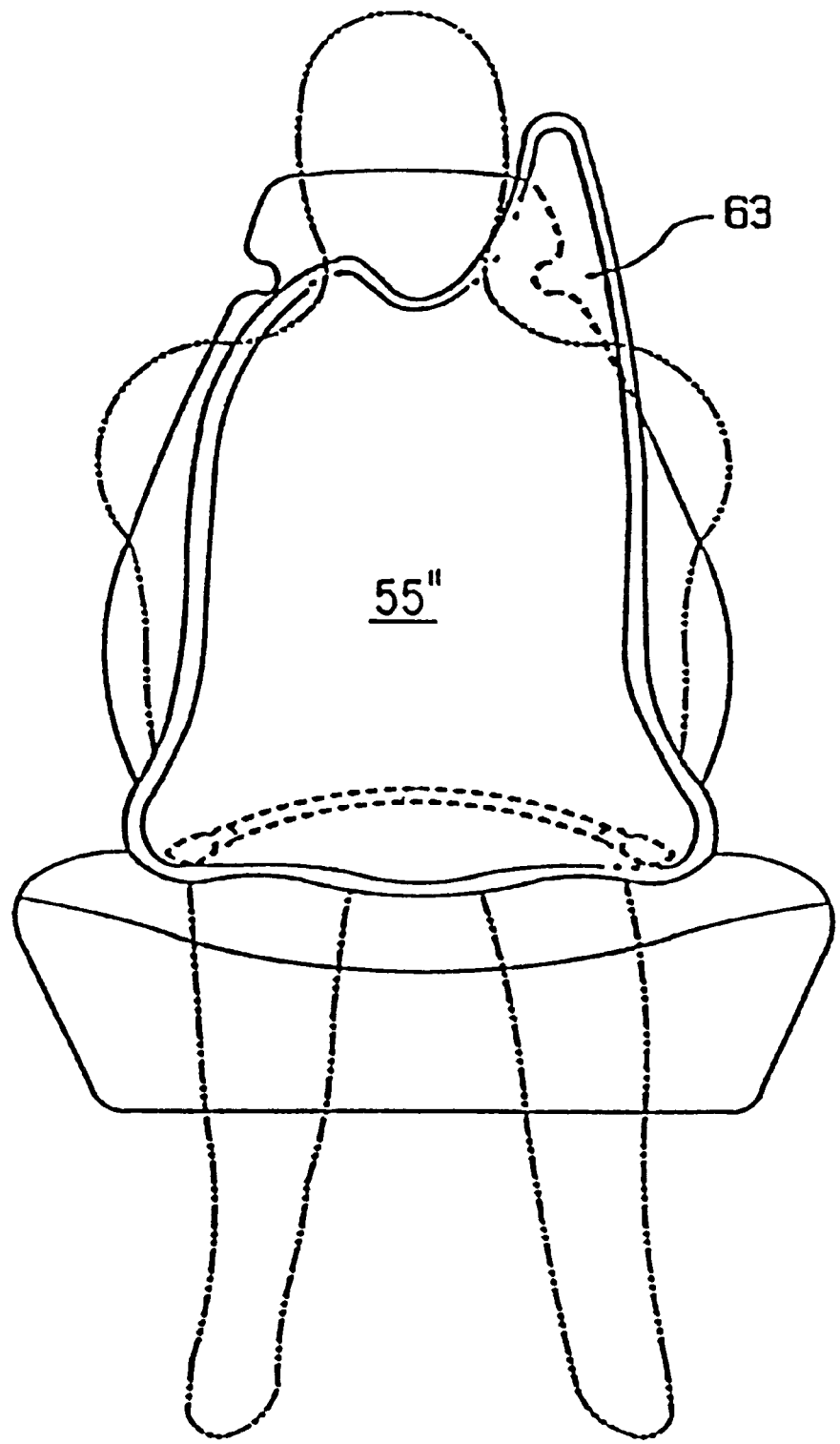
FIG. 16c is a front elevational view of a bag including a head side support section.

FIG. 16a shows use of side pockets 61, 62 created by generally-vertical stitch rows 61a, 62a. Deployment of side pockets 61, 62 due to stitching failure is shown in FIG. 16b. FIG. 16c illustrates bag 55" with a head protecting portion 63. Stitching bag panels using any suitable patterns are contemplated by the present invention to provide additional inflatable member size during inflation and the creation of forces resulting from occupant restraint.

As an alternative to non-stretch inflatable member material and the fracturable stitching described above, deployment of larger inflatable member volumes to accommodate larger occupants may be accomplished by fabricating inflatable members, such as bags, of expansible or stretchable material. Members made of fabrics or other materials which expand or stretch when inflated and when additional forces are applied by the occupant (O) during or after inflation are alternatively useful alone or in combination with non-stretchable materials.

Figure 17:
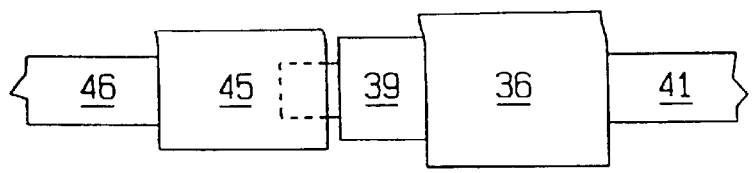
FIG. 17 is a partial schematic view of the belt sections, tongue and buckle arrangement with an undeployed inflatable member.

Inflating systems positioned within the belt arrangement include a crash detector which sends a signal to an initiator which in turn initiates the function of an inflator causing the rapid flow of gases to the inflatable member. In FIG. 17 belt sections 41, 46, buckle 45, tongue unit 39 and uninflated member 36 are shown (see also FIG. 11).

Figure 18:
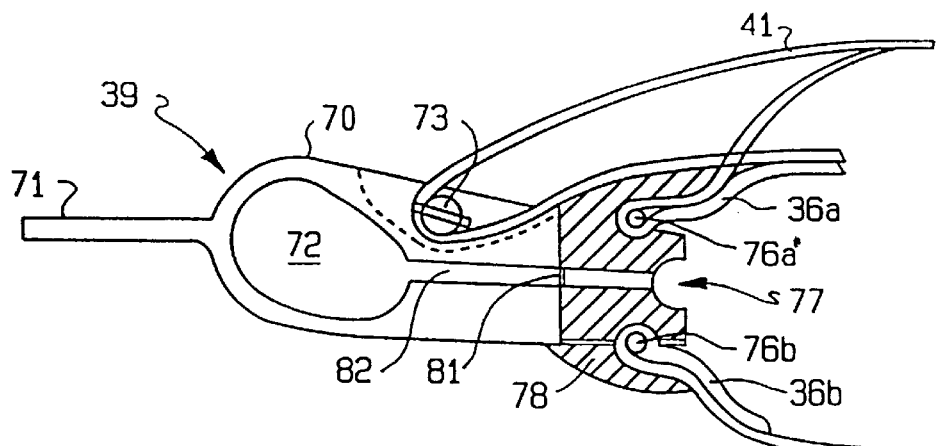
FIG. 18 is a partial sectional view through the tongue unit and inflatable member of FIG. 17.

Turning to FIG. 18, tongue unit 39 includes tongue housing 70, tongue prong 71, inflator 72, and roller clamp 73 for adjusting the effective length of belt section 41. Also shown are inflatable flexible member panels 36a, 36b of inflatable member 36 which engage tongue header pins 76a, 76b, mounted in tongue header 77. Header 77 includes header lock section 78. After panels 36a, 36b are positioned on and around pins 76a, 76b slide lock section 78 is forced in place to hold the inflatable member panels 36a, 36b in place. Also shown is rupturable diaphragm 81 in gas passageway 82.

Figure 19:
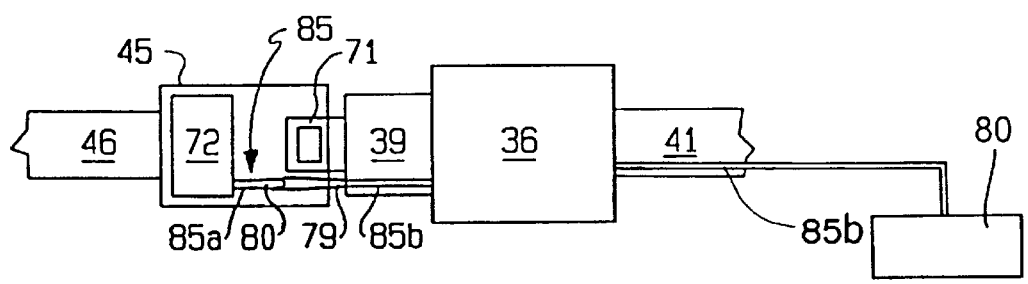
FIG. 19 is a schematic view of a belt arrangement with the inflator in the buckle and the connectable tongue unit.
Figure 20:
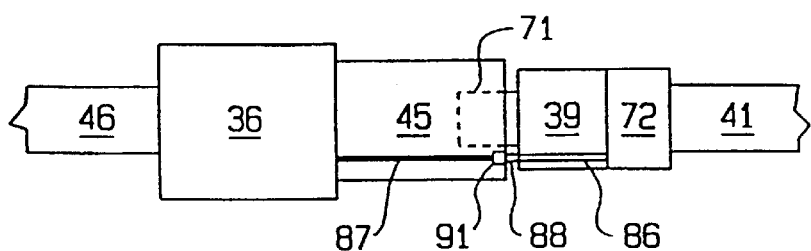
FIG. 20 is a schematic view of a belt arrangement showing the inflatable member attached to the buckle and with the inflator in the tongue unit.

In schematic FIG. 19, inflator 72 is located in buckle 45 and the origin of the electrical signal to cause inflator 72 to operate is located on the tongue side of the belt arrangement. Electrical wire 85 with tandemnly-connected wire sections 85a, 85b pass from crash detector 80 through belt section 41 and tongue unit 39 to buckle 45 into inflator 72. Wire section 85b includes a socket 79 and wire section 85a includes a tapered head 80 shaped to enter socket 79 for electrical connection. This arrangement permits the crash detector to be located in the anchor that serves belt section 41 to provide the necessary tongue-to-buckle detachable connection. In FIG. 20, the inflator 72 is located in the tongue unit 39 and the inflatable member 36 is mounted on the buckle 45. Gases generated in inflator 72 travel in gas passageway segments 86, 87 which segments are detachably connected by a nipple 88 and socket 91.

Inflater 72 may be any suitable inflator; however, it is preferably a hybrid inflator with a pressurized housing having walls and with the propellant positioned therein spaced from the walls. Any suitable pyrotechnic material or propellant may be used to create the required gases. Preferable propellants whose burn time is in the sub-millisecond range when combusted at a pressure of approximately 25,000 psi are used in the practice of this invention. The materials (propellants) utilized should have extremely short function times. The materials should have web thicknesses (the thicknesses that the materials burn through during their combustion) that are small and that will complete combustion in a short time such as less than a millisecond.

Universal Propulsion designated 7019a propellant may be used. The 7019a propellant is a propellant material including an oxidizer such as ammonium nitrate; a nitramine (preferably thermally stable) and a binder. The nitramine may be cyclo-1,3,5-trimethylene-2,4,6-trinitramine (RDX) or cyclo-1,3,5,7-tetramethylene-2,4,6,8-tetranitramine (HMX). Propellant 7019a is a solvent processed propellant which leaves a microscopic fine porosity throughout the quantity of propellant material positioned in inflator 72. The binder should be a small percentage i.e. 4% of the material.

Propellant components should be proportioned to accomplish rapid and complete burning to produce gases which are environmentally sound and burn to reduce or eliminate inflator wall heating. The microscopic fine porosity in the propellant allows it to be produced with granules instead of as a single grain piece with each granule having a small web. The granules have the advantage of not being susceptible to cracks and the micro-porosity as well as the surface area created by the micro granules enable the propellant to be extremely quickly ignited. The propellant has high thermal stability and therefore requires high temperature to ignite it.

In hybrid inflators where propellants are stored under pressure of a gas such as an inert gas, chemical degradation is not enhanced and further the high pressure aids markedly in providing a high speed ignition and burning capability to the system. Extremely short burning times are best accomplished by burning these propellants in a very high pressure environment. Additionally, the small granules and microporse propellant leading to the ultra-thin web facilitate the fact that the propellant will be consumed before it can be explosively hurled into contact with the walls including side walls of the inflator 72. The reduction or elimination of propellant striking the walls of the inflator housing reduces the rise in temperature of the inflator and facilitates its use adjacent or even in contact with the occupant.

Finally, inflator propellant materials may in addition include Hercules "Hi-Temp" brand propellant.

Figure 21:
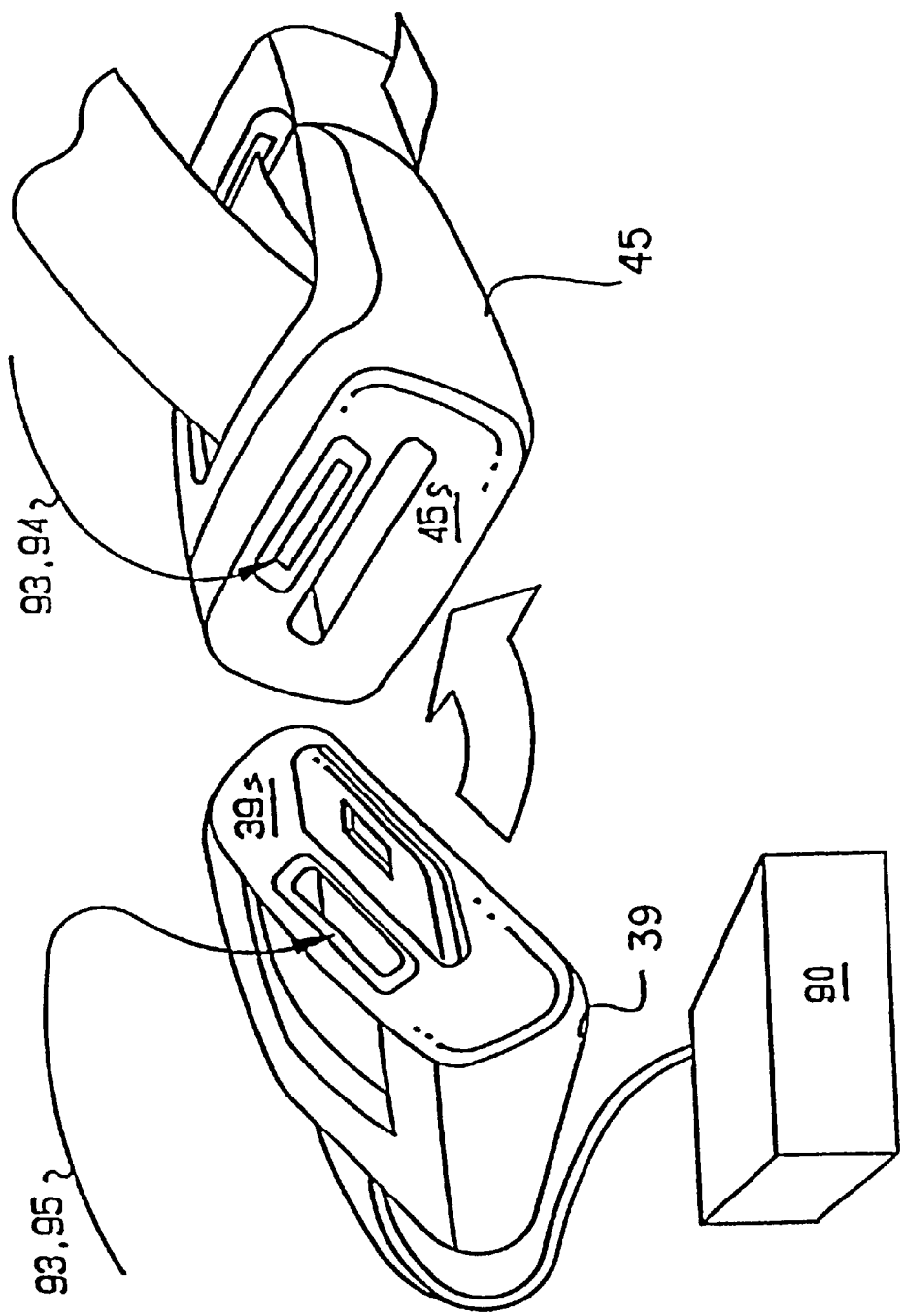
FIG. 21 is a perspective view showing the tongue unit and buckle detached with transformer portions on each.

In FIG. 21, electrical signals are passed from tongue unit 39 to buckle 45 employing a transformer 93 with one transformer portion 94 of the transformer 93 in the buckle 45 and forming a part of buckle surface 45s and the other portion 95 of the transformer 93 in the tongue unit 39 and forming a part of tongue unit surface 39s. Electrical signals generated in transformer portion 95 cause electrical signals to be generated in transformer portion 94. Such signal transfer permits an electrical signal generated on one side of the belt system to be transmitted to the other side of the belt system so that the crash detector can be located on either side of belt system 38. Also shown in FIG. 21 is crash detector 90 positioned on the tongue side for producing an electrical signal upon vehicle deceleration.

It is seen that when tongue and buckle are buckled and unbuckled, electricity and gas flow from one side of the lap belt to the other side of the lap belt which may be effected by the detachable connections described above or any other suitable arrangement.

Figure 22:
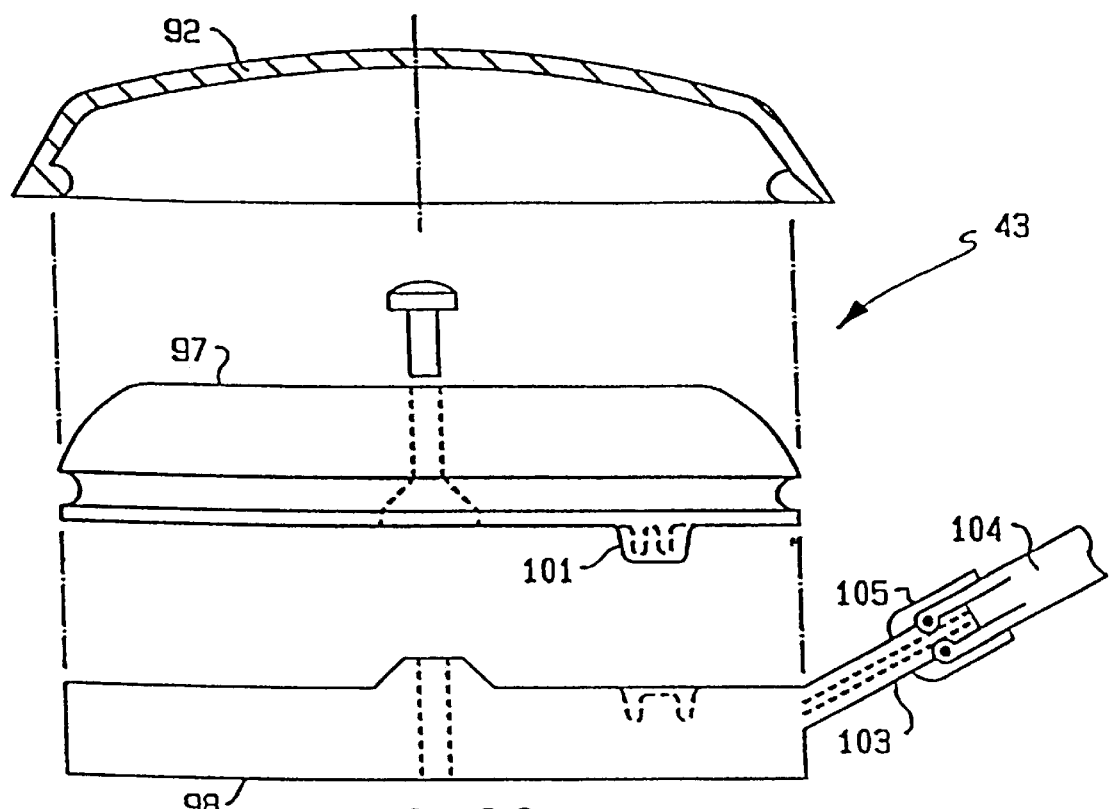
FIG. 22 is a sectional exploded view of a belt anchor.
Figure 22A:
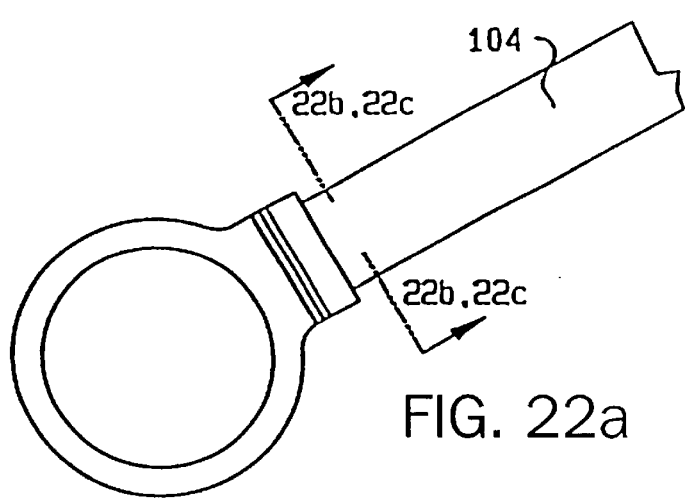
FIG. 22a is a side view of the anchor of FIG. 22 including the belt section.
Figure 22B:
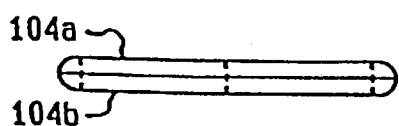
FIG. 22b is a sectional view of a belt section taken along line 22b—22b of FIG. 22.
Figure 22C:
FIG. 22c is a view similar to FIG. 22b with the belt section having a gas passage formed therein by gas pressure.

In FIGS. 22, 22a and 22b, anchor 43 includes anchor cover 92 and anchor shielded housing 97 for shielding against extraneous radio waves or other waves that might prematurely activate the initiator. Also shown is anchor swivel unit 98. Initiator 101 is mounted in housing 97 and an inflator (not shown) is positioned in swivel unit 98. Gases generated in swivel unit 98 by the inflator pass through exit neck 103, connector 105 into belt 104 which belt is constructed of two layers 104a, 104b. Layers 104a, 104b separate upon application of gas-generated pressure to form gas passage 106 (see FIGS. 22b, 22c). Prior to inflation belt layers 104a, 104b may be stitched or glued together. The crash detector in anchor 43 (not shown) may be battery powered with low voltage being indicated by a light or an audible signal. Since the electrical requirements to operate the system are small, batteries located in the anchors may be used with replacement required only after five or more years.

Figure 23:
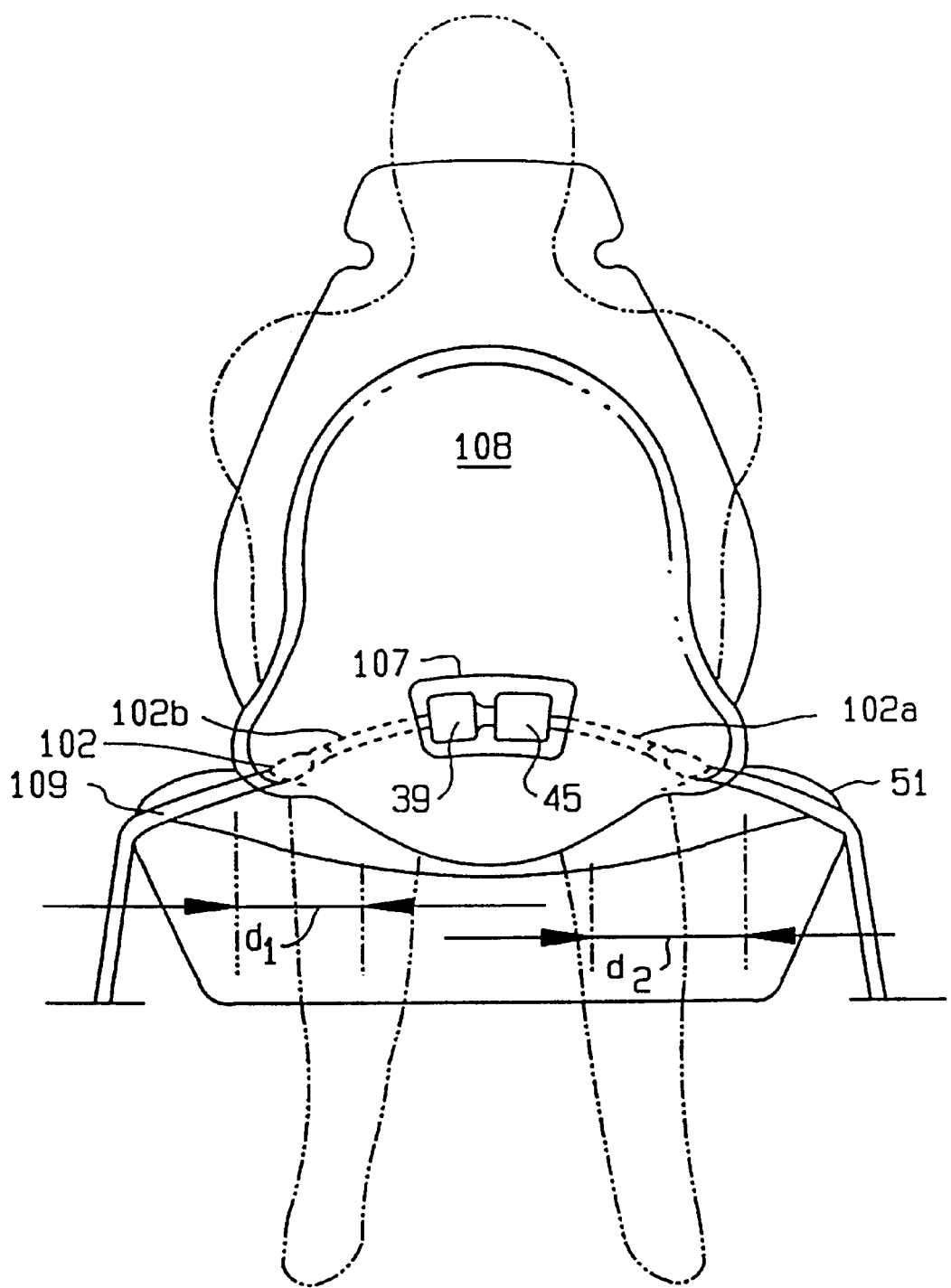
FIG. 23 is a front elevational view of a further bag embodiment with an opening therethrough for centered lap belt buckle and tongue manipulation.

Referring to FIG. 23, an alternate bag design is shown in which bag 108 has a central opening 107 to permit buckle 45 and tongue unit 39 to be readily operated in the central area of the occupant's lap. Central opening 107 is not part of the bag pressure-retaining envelope. Similarly, as stated above bag passageway 102 is not part of the pressure-retaining envelope of bag 108. Central opening 107 may through alternate bag design be located on either side of the center of bag 108 as shown in FIG. 23. Belt 109 passes through bag passageway 102 which is divided into passageway sections 102a, 102b which sections 102a, 102b are separated by bag central opening 107.

Finally, a further bag embodiment is shown in FIGS. 24, 24a–c, which bag 110 consists of upper and lower sections 111, 112 and waist section 113 with lap belt 116 passing around bag 110 rather than through a bag passageway as described above in earlier embodiments. Belt 116 is positioned against bag waist section 113 upon inflation. Upper bag section 111 engages occupant's torso and lower bag section 112 engages the occupants legs and seat surface. Inflated belt section 113 which has belt 116 engaging its outer surface positions belt 116 distance X from occupant's waistline. Bag sections 111, 112 engage at line L and with added forces during deceleration and inflation bag portions 111, 112 may be forced further against one another.

Figure 24:
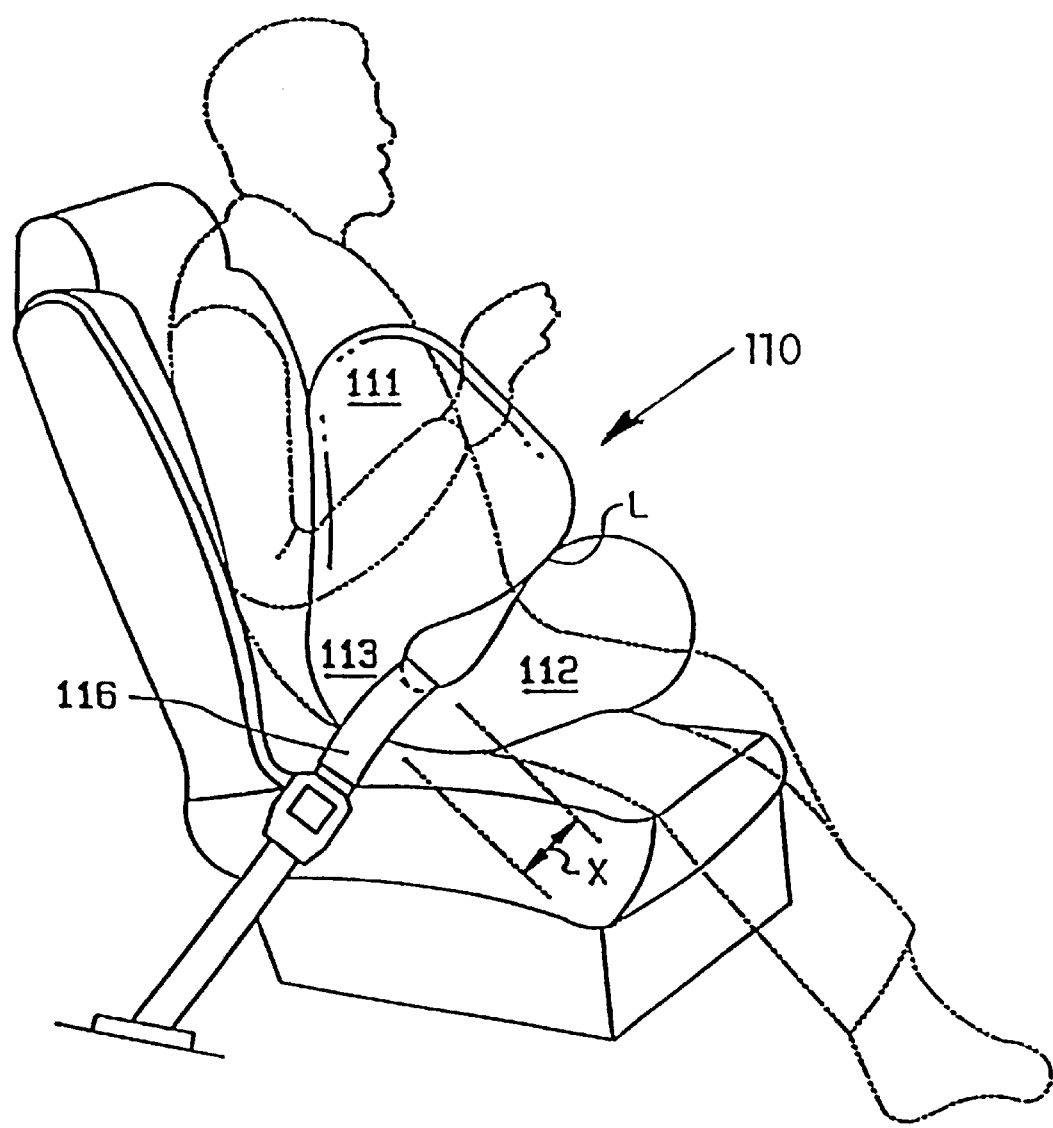
FIG. 24 is a side perspective view of a further configured bag embodiment with the lap belt positioned against the bag surface.
Figure 24A:
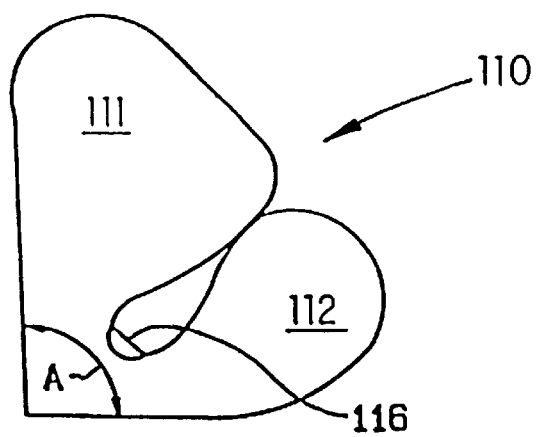
FIG. 24a is a schematic diagram of the bag of FIG. 24 positioned illustrating a passenger's torso and legs at a 90° angle.
Figure 24B:
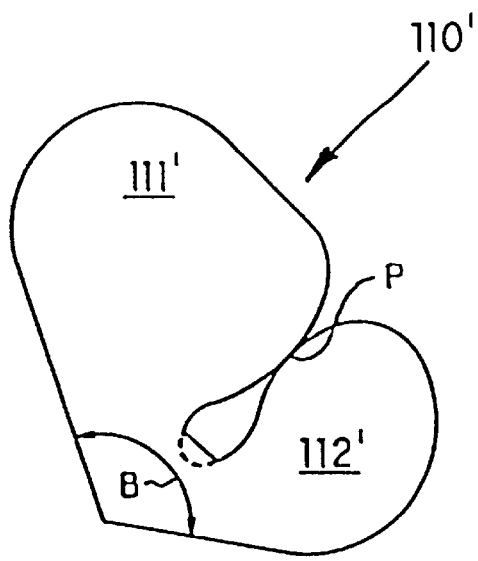
FIG. 24b is a further schematic similar to FIG. 24a in which the torso-to-leg angle is greater than 90°.
Figure 24C:
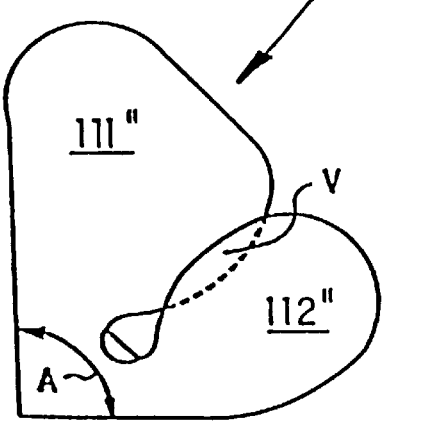
FIG. 24c is a further schematic in which the angle is 90° and bag sections theoretically overlap.

Turning now to schematic FIG. 24a, bag sections 111, 112 are sized to form a ninety degree (90°) angle A between the torso and legs of the occupant. FIG. 24b shows bag 110' sized to form an angle B of 105° or more when sections 111', 112' touch at point P. In FIG. 24c bag sections 111", 112" of bag 110" are shown being distorted by forces applied by the occupant as sections 111", 112" compress. Volume V represents the volume of theoretical overlap of sections 111", 112" if no bag section compression occurred. The volume or pressure of gases supplied to bag section 111" may differ from the volume or pressure of gases fed to the bag section 112".

It is contemplated that the present invention may be used in aircraft, school buses, passenger cars and other vehicles. In airplane applications having rows of seats, each row or portion should be equipped with a separate crash detector.

The present invention is particularly adaptable for use in aircraft or other vehicles where lap belts have been in common use for many years. Bags can be deployed from the lap belt area without need for installation of equipment in the seat backs located forward of the seated occupants. The invention provides protection for occupants, including pilots and passengers, of large or small aircraft.

In certain crashes of a large airplane in which the forward portion of the airplane may rapidly decelerate and come to rest while the rearward portion of the plane continues to decelerate, air bag deployment for effective occupant protection should occur in the forward part of the airplane before bag deployment occurs in the rearward portion of the plane. Commercial passenger planes with their long length are subject to a traveling crash wave within the plane. Where a crash involves the front of an aircraft striking a building, a mountain, the ground, or other object deceleration occurs in the forward part of the aircraft before it occurs in the rear of the aircraft. The points of rapid deceleration therefore move from front to back in a waveform. This waveform of deceleration requires that air bags in the front of the plane be deployed before air bags in the rear of the plane.

Figure 25:
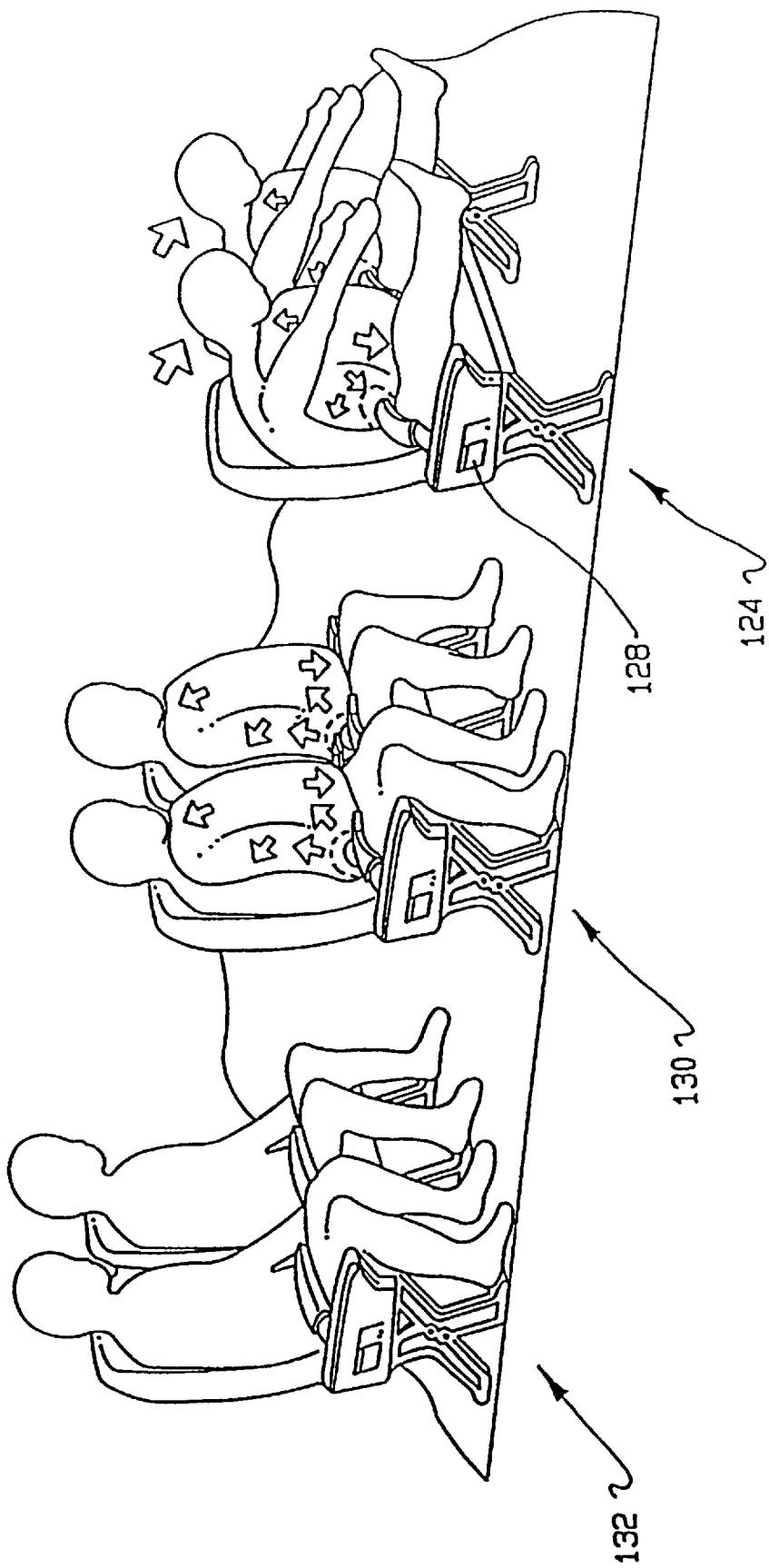
FIG. 25 is a perspective view of occupants in rows of seats in which lap mounted bags deploy row-by-row.

Turning to FIG. 25, three (3) rows of passengers are shown in which a forward row 124 is equipped with a gas supply unit 128 to serve that row. Gas supply unit 128 includes an initiator, an inflator and gas supply lines (not shown) which lines supply the bags mounted on the lap belts positioned across laps of the occupants in their seats. The inflator is sized to supply the air bags which serve each of the two (2) seats in row 124. Gas supply unit 128 also includes a crash detector or other arrangement for creating a crash signal when a selected deceleration occurs at row 124. The crash triggers the firing system creating a crash signal which in turn causes the initiator to ignite the inflator to rapidly create gases and supply them to the air bags in row 124. The air bags of forward row 124 are in a state of deployment in which the bags have been fully filled with gas and the passengers' torsos have swung forward.

Also shown in FIG. 25 is middle row 130 in which bag deployment has started and rearward row 132 in which the crash detector has not yet caused the air supply system to commence operation.

Alternatively, a gas supply unit may be positioned adjacent each individual seat in each row. Each supply unit may have its own crash detector firing system and inflator. An alternative arrangement for sequentially initiating bag deployment in a large aircraft is to have a single crash detector serve more than one row of seats.

When a crash detector serves more than one row of seats the signal serving the more rearward rows is preferably delayed so that bag deployment occurs when it can provide maximum protection for each of the occupants in each row. Deployment is timed to occur sufficiently in advance of rapid deceleration of the occupants to allow for bag inflation to provide maximum protection from injury or death.

Figure 26:
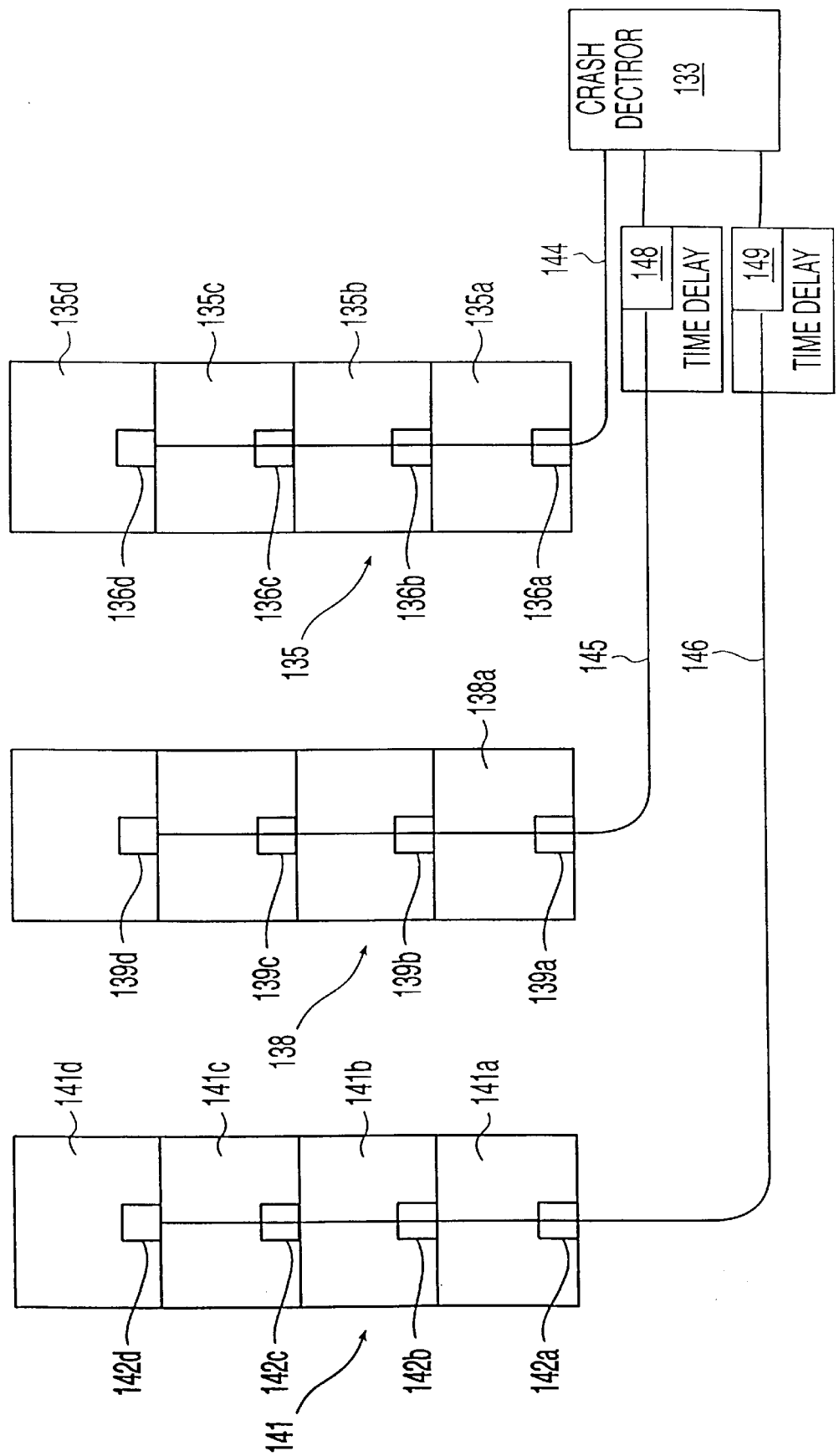
FIG. 26 is a schematic of row of seats, inflation arrangements and controls for such inflation arrangements.
Figure 26A:
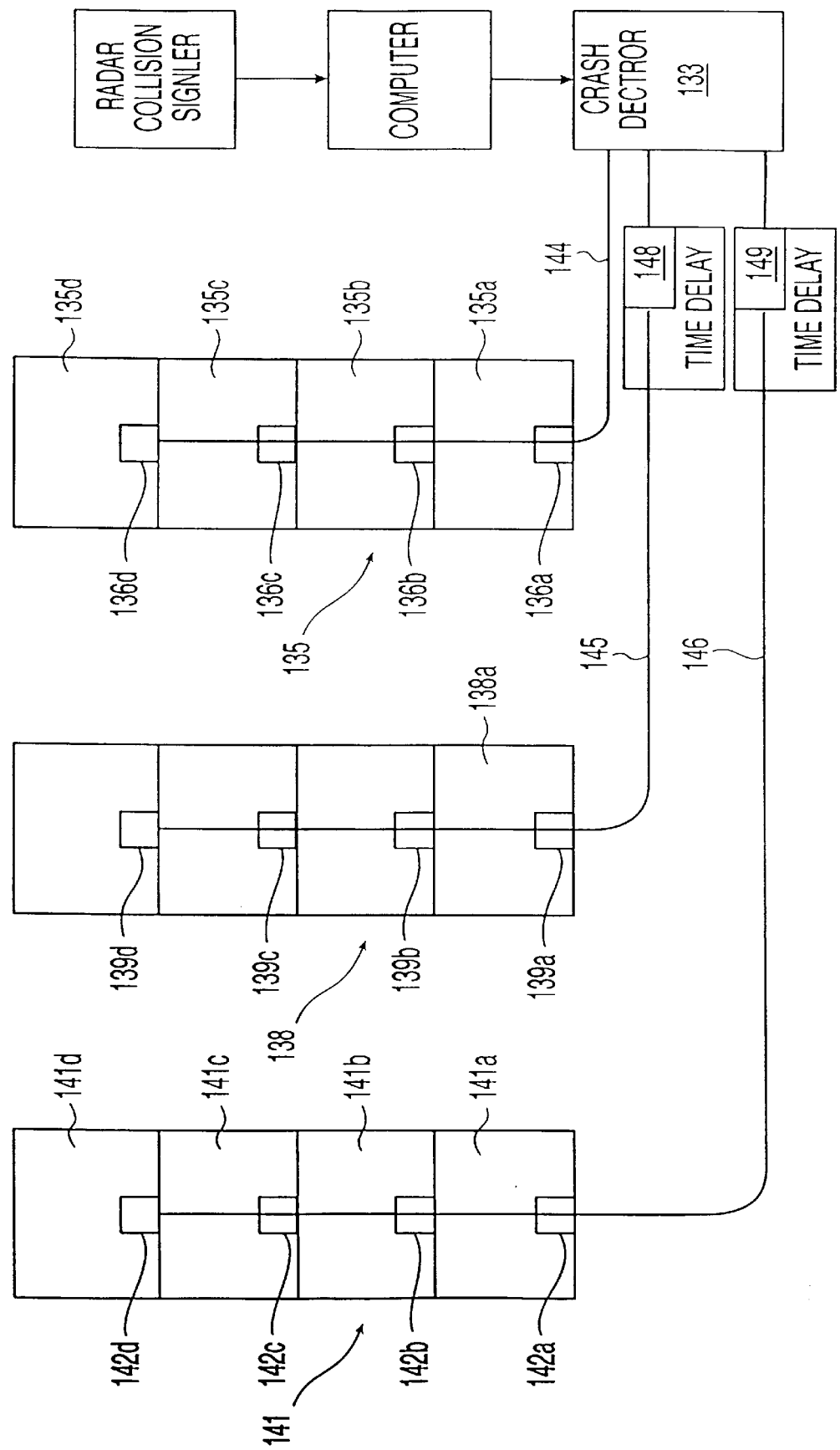

Turning to FIG. 26 crash detector 133 serves three rows of seats. Forward row 135 has four (4) seats 135a–d. Each seat has its own gas supply unit 136a–d. Middle row 138 with four (4) seats 138a–d has each of its seats served by a gas supply unit 139a–d and rearward row 141 with seats 141a–d have gas supply units 142a–d. Crash detector 133 supplies signals to each row along electrical conduits 144, 145 and 146. The signals transmitted along conduit 144 cause the start of initiator, followed by, inflator activation, immediately after detector 133 measures a sudden deceleration. The signal transmitted along conduit 145 (which is simultaneously transmitted with the conduit 146 signal) is delayed by time delay 148 so that bag deployment in middle row 138 occurs after row 135 deployment. The signal transmitted along conduit 146, again simultaneously transmitted with the 144 conduit signal, is also delayed by time delay 149 so that rearward row 141 is deployed after middle row 138. An aircraft with forty (40) rows of seats would be equipped with a dozen or more crash detectors.

The crash detector and firing signal unit 133 include a firing system which produces a low voltage (amperage) signal. The system is preferably battery powered.

Figure 27:
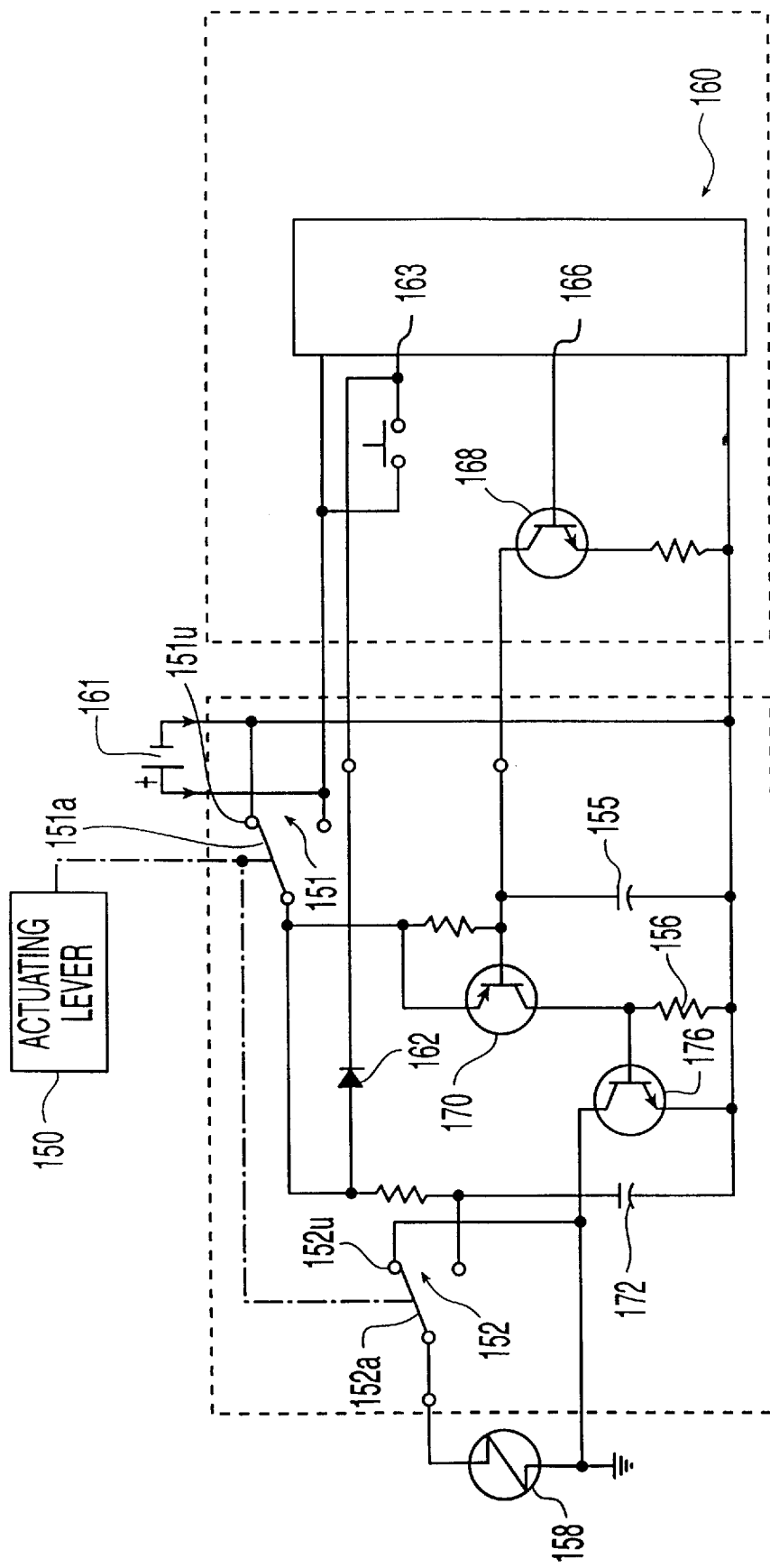
FIG. 27 is a schematic and circuit diagram for controlling inflation of a bag or bags properly timed after rapid vehicle deceleration.

Turning to FIG. 27, circuitry for a crash detector is shown in which actuating lever 150 is moved with aircraft deceleration Lever 150 moves when deceleration in that section of the plane occurs to in turn move switch arms 151a, 152a of switch 151, 152 respectively. Prior to the occurrence of a crash, switch arms 151a, 152a engage the upper stationary contact 151u, 152u of switches 151, 152 which short circuits capacitor 155 and resistor 156. Switch 152 also provides a short circuit across pyrotechnic squib 158. This prevents capacitor 155 from being charged and the squib 158 from being fired. In this pre-crash mode, the timing circuit 160 is powered by battery 161.

Upon a crash, actuating lever 150 moves switch arms 151a, 152a to their lower positions causing a voltage to be applied by battery 161 through diode 162 to start terminal 163 of timing circuit 160. Capacitor 155 becomes charged.

Timing circuit 160 times the preselected period. At the end of the period, the timing circuit 160 produces a series of pulses on line 166. These pulses trigger the transistor 168 into a state of conductivity at the same frequency as the pulses. When the transistor 168 becomes conductive, a relatively low voltage is produced on the collector of the transistor 168. This low voltage discharges the capacitor 155 and is introduced to the base of the transistor 170 to make the transistor 170 conductive. The pulses are filtered out by capacitor 155 as a result of the charging of the capacitor through a circuit including the battery 161, the switch 151 and the base/emitter junction of the transistor 170.

The flow of current through the transistor 170 causes a relatively high voltage to be produced across the resistor 156. This high voltage establishes a state of conductivity in the transistor 176. When the transistor 176 becomes conductive, it has a relatively low impedance. This causes a circuit to be established through the capacitor 172, the switch 152 (in the second state of operation), the pyrotechnic squib 158 and the transistor 176. The capacitor 172 then discharges through the pyrotechnic initiator 158 to fire the pyrotechnic initiator. The firing of the pyrotechnic initiator 158 initiates the operation of the inflator to inflate bags in a passenger row. U.S. Pat. No. 5,335,598 issued Aug. 9, 1994 and owned by the assignee of the present application discloses and claims the timing system including a timing circuit as described above. U.S. Pat. No. 5,335,598 is incorporated herein by reference.

The firing circuit and initiator 158 may be housed in a single housing as disclosed and claimed in U.S. Pat. No. 5,499,579 issued Mar. 19, 1996 and owned by the assignee of the present invention. U.S. Pat. No. 5,499,579 is incorporated herein by reference.

The timing circuit 160 may utilize an input mechanism as the source of energy instead of a battery. An input electrical pulse, for example, of five (5) amperes and five (5) milliseconds, from an input mechanism is preferred rectified converting it to direct current which energy is stored in a capacitor as disclosed and claimed in U.S. Pat. No. 5,507,230 issued Apr. 16, 1996 and owned by the assignee of the present invention. U.S. Pat. No. 5,507,230 is incorporated herein by reference.

Where electrical noise may trigger premature activation of the initiator, Faraday shielding may be placed around the firing circuit or internal filtering may be used or both. The triggering signal may be filtered by a low pass filter (e.g. inductance and capacitance) to prevent noise from passing. Finite filtering may also be employed. A device (e.g.) zener diode) limits the triggering signal amplitude. The filtered triggering signal charges the capacitance in the low pass filter. The capacitor charge causes a second transistor to become conductive, thereby producing a voltage across an impedance. This voltage triggers the first transistor to the conductive state to provide for the firing of the initiator.

Faraday shielding and filtering are further described in U.S. Pat. No. 5,440,991 issued Aug. 15, 1995 and owned by the assignee of the present invention.

For another embodiment of the invention, the crash detector may be triggered by propagated energy waves such as radar waves rather than by aircraft deceleration. For example, a radar signal from a signaler may be sent out by the airplane which signal would reflect off an object which is on a collision course with the airplane. The reflected signal would then trigger the crash detector to start the sequence of inflation row by row of the occupants' air bags prior to the collision. A computer may be used to compute the time of the deceleration in various vehicle portions. By starting the inflation process, prior to collision, the time for deployment may be extended from twenty or forty milliseconds to 1000 milliseconds. For example, if an airplane is traveling at 120 mph (176 ft. per second) and the bag is deployed when the airplane is 176 ft from collision, a period of 1000 milliseconds may be provided for deployment to occur. Longer deployment times reduce the peak forces and pressure applied to passengers thus reducing the risk of injury by the bags during inflation.

The forces generated in the lap belts of the present invention are about one thousand (1000) pounds per side. Gas bag pressure upon full inflation is about 20 psig. Inflation times are between 10 and 1000 milliseconds.

Inflatable members other than bags such as belts may be useful in practicing the present invention. The embodiments of FIGS. 25–27 are also useful in vehicles other than airplanes such as trains, buses and elongated automobiles. Further such embodiments may employ the same inflators using the same pyrotechnic materials and propellants described herein.

What is claimed is:

1. A vehicle restraint system for restraining during rapid deceleration occupants in a vehicle having first and second vehicle portions in which deceleration occurs in the first portion prior to deceleration in the second portion and in which first and second occupants are positioned in the first and second portions, respectively, comprising
   a) a first inflatable member mounted to be deployed to protect the first occupant;
   b) a second inflatable member mounted to be deployed to protect the second occupant;
   c) an inflation means for inflating each of said inflatable members; and
   d) a crash detector firing system for controlling the inflation means which serve each of the inflatable members which firing system includes a deceleration detection detector which detector transmits a separate signal to each inflation means so that the first inflatable member inflates prior to the second inflatable member.

2. The vehicle restraint system of claim 1 in which occupant seats are positioned in a row in the first vehicle portion and in which occupant seats are positioned in a row in the second vehicle portion.

3. The vehicle restraint system of claim 1 in which the vehicle is an airplane.

4. The vehicle restraint system of claim 1 in which the vehicle is a bus.

5. The vehicle restraint system of claim 1 in which the vehicle is a train.

6. The vehicle restraint system of claim 1 in which the vehicle is an automobile.

* * * * *